(12) United States Patent
Shah et al.

(10) Patent No.: US 11,423,118 B2
(45) Date of Patent: Aug. 23, 2022

(54) MODEL AGNOSTIC TIME SERIES ANALYSIS VIA MATRIX ESTIMATION

(71) Applicant: Massachusetts Institute of Technology, Cambridge, MA (US)

(72) Inventors: Devavrat D. Shah, Waban, MA (US); Anish Agarwal, Cambridge, MA (US); Muhammad Amjad, Cambridge, MA (US); Dennis Shen, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 900 days.

(21) Appl. No.: 16/241,413

(22) Filed: Jan. 7, 2019

(65) Prior Publication Data

US 2020/0218776 A1    Jul. 9, 2020

(51) Int. Cl.
| | | |
|---|---|---|
| *G06F 17/16* | (2006.01) | |
| *G06F 17/18* | (2006.01) | |
| *G06N 7/00* | (2006.01) | |
| *G01D 1/14* | (2006.01) | |
| *G01D 1/02* | (2006.01) | |

(52) U.S. Cl.
CPC .............. *G06F 17/16* (2013.01); *G06F 17/18* (2013.01); *G06N 7/005* (2013.01); *G01D 1/02* (2013.01); *G01D 1/14* (2013.01); *G05B 2219/37524* (2013.01)

(58) Field of Classification Search
CPC ......... G06F 17/16; G06F 17/18; G06N 7/005; G01D 1/14; G05B 2219/37524
USPC .......................................................... 702/196
See application file for complete search history.

(56) References Cited

U.S. PATENT DOCUMENTS

2020/0202057 A1* 6/2020 Chen ...................... G06N 20/00
2020/0285983 A1* 9/2020 Bhattacharyya .... G06F 16/2474

OTHER PUBLICATIONS

Abbe, et al.; "Community detection in general stochastic block models: Fundamental limits and efficient recovery algorithms"; Foundations of Computer Science (FOCS); Oct. 17, 2015; 55 Pages.

(Continued)

*Primary Examiner* — Aditya S Bhat
(74) *Attorney, Agent, or Firm* — Daly, Crowley, Mofford & Durkee LLP

(57) ABSTRACT

A system and method model a time series from missing data by imputing missing values, denoising measured but noisy values, and forecasting future values of a single time series. A time series of potentially noisy, partially-measured values of a physical process is represented as a non-overlapping matrix. For several classes of common model functions, it can be proved that the resulting matrix has a low rank or approximately low rank, allowing a matrix estimation technique, for example singular value thresholding, to be efficiently applied. Applying such a technique produces a mean matrix that estimates latent values, of the physical process at times or intervals corresponding to measurements, with less error than previously known methods. These latent values have been denoised (if noisy) and imputed (if missing). Linear regression of the estimated latent values permits forecasting with an error that decreases as more measurements are made.

18 Claims, 19 Drawing Sheets

(56) References Cited

OTHER PUBLICATIONS

Abbe, et al.; "Detection in the stochastic block model with multiple clusters: proof of the achievability conjectures, acyclic bp, and the information-computation gap"; Advances in neural information processing systems; Dec. 2016; 78 Pages.

Airoldi, et al.; "Stochastic blockmodel approximation of a graphon: Theory and consistent estimation"; Advances in Neural Information Processing Systems (NIPS); Nov. 2013; 21 Pages.

Anandkumar, et al.; "A tensor spectral approach to learning mixed membership community models"; JMLR: Workshop and Conference Proceedings; vol. 30; Jan. 2013; 16 Pages.

Anava, et al.; "Online time series prediction with missing data"; Proceedings of the 32nd International Conference on Machine Learning; JMLR: W&CP vol. 37; Jan. 2015; 9 Pages.

Baum, et al.; "Statistical inference for probabilistic functions of finite state markov chains"; The annals of mathematical statistics; pp. 1554-1563; Apr. 1966; 10 Pages.

Borgs, et al.; "Thy friend is my friend: Iterative collaborative filtering for sparse matrix estimation"; Advances in Neural Information Processing Systems; Jan. 1, 2017; 12 Pages.

Borgs, et al.; "Consistent nonparametric estimation for heavy-tailed sparse graphs"; Feb. 2016; 48 Pages.

Candes, et al.; "The power of convex relaxation: Near-optimal matrix completion"; IEEE Transactions on Information Theory; pp. 2053-2080; May 2010; 28 Pages.

Chatterjee; "Matrix estimation by universal singular value thresholding"; The Annals of Statistics, vol. 43; No. 1: pp. 177-214, Sep. 2014; 38 Pages.

Chen, et al.; "Fast low-rank estimation by projected gradient descent: General statistical and algorithmic guarantees"; Sep. 2015; 63 Pages.

Davenport, et al.; "1-bit matrix completion"; Jul. 2014; 31 Pages.

Dunsmuir, et al.; "Estimation of Time Series Models in the Presence of Missing Data"; Journal of the American Statistical Association; vol. 76; No. 375; Sep. 1, 1981; pp. 560-568; 10 Pages.

Feder, et al.; "Universal prediction of individual sequences"; IEEE Transactions on Information Theory; vol. 38; No. 4; pp. 1258-1270; Jul. 1992; 13 Pages.

Hoeffding; "Probability Inequalities for Sums of Bounded Random Variables"; Journal of the American Statistical Association; vol. 58; No. 301; Mar. 1, 1963; pp. 13-30; 19 Pages.

Honaker, et al.; "Amelia ii: A program for missing data"; May 2018; 54 Pages.

Hopkins, et al.; "Bayesian estimation from few samples: community detection and related problems"; arXiv:1710.00264v1; Sep. 30, 2017; 76 Pages.

Kalman; "A New Approach to Linear Filtering and Prediction Problems"; Journal of Basic Engineering; Mar. 1, 1960; 11 Pages.

Keshavan, et al.; "Matrix completion from a few entries"; Sep. 17, 2009; 31 Pages.

Keshavan, et al.; "Matrix completion from noisy entries"; Journal of Machine Learning Research; Jul. 2010; 22 Pages.

Lee, et al.; "Blind regression: Nonparametric regression for latent variable models via collaborative filtering"; $30^{th}$ Conference on Neural Information Processing Systems (NIPS); Dec. 2016; 9 Pages.

Negahban, et al.; "Estimation of (near) low-rank matrices with noise and high-dimensional scaling"; The Annals of Statistics; pp. 1069-1097; Apr. 2011; 46 Pages.

Recht, et al.; "A simpler approach to matrix completion"; Journal of Machine Learning Research; Dec. 2011; 18 Pages.

Rissanen; "Universal coding, information, prediction, and estimation"; IEEE Transactions on Information Theory; vol. 30; No. 4; pp. 629-636; Jul. 1984; 8 Pages.

Schmidhuber; "Learning complex, extended sequences using the principle of history compression"; Neural Computation; vol. 4; No. 2; pp. 234-242; Jan. 1992; 7 Pages.

Shields; "The interactions between ergodic theory and information theory"; IEEE Transactions on Information Theory; Jan. 1998; 15 Pages.

Shumway, et al.; "An Approach to Time Series Smoothing and Forecasting Using the Em Algorithm"; Journal of Time Series Analysis; vol. 3; No. 4; pp. 253-264; Jan. 1, 1982; 12 Pages.

Zhang, et al.; "Estimating network edge probabilities by neighborhood smoothing"; Jan. 2016; 22 Pages.

\* cited by examiner

MODEL AGNOSTIC TIME SERIES ANALYSIS VIA MATRIX ESTIMATION

GOVERNMENT LICENSE RIGHTS

This invention was made with Government support under Grant Nos. CMMI-1462158 and CMMI-1634259 awarded by the National Science Foundation. The Government has certain rights in the invention.

FIELD

The disclosure pertains generally to methods and devices for performing inference, and more particularly to imputing and forecasting a physical process based on noisy, partial observations thereof.

BACKGROUND

As is known in the art, a series of data values indexed (or listed or graphed) in time order may be referred to as a time series. Time series are used in a wide variety of applications including, but not limited to: signal processing, pattern recognition, weather forecasting, finance, earthquake prediction, electroencephalography, control engineering, astronomy, communications engineering, and largely in any domain of applied science and engineering which involves measurements over time. Time series are useful because they permit people to model and make predictions about the world.

Time series analysis generally refers to techniques for analyzing measured or observed time series data, typically for the purpose of forming a mathematical model of an underlying (or "latent") process that gave rise to those measured data values. Such models may include statistics and other characteristics of the data. At the highest level, time series modeling primarily involves viewing a process or system as a measurable function, and the goal of model learning is to identify this function from observations of values of the function over time. FIG. 1 schematically illustrates a time series analysis problem. As shown in FIG. 1, a system 10 may be expressed (or modeled) as a latent function having values 11, 12, 13, and 14 at four successive points in time, at which were made corresponding observations or measurements (i.e. data values) 15, 16, 17, and 18.

The problem of analyzing time series is difficult because, in general, the observed values 15, 16, 17, 18 are not equal to corresponding values 11, 12, 13, 14 of the underlying modeling function. This disparity is due to a variety of reasons, including faults in measuring equipment, measurement interference due to other physical processes, and so on. In some cases, these issues entirely obscure or prevent an observation from being made, while in others they make it difficult to determine a simple model that precisely describes the underlying process.

Given that the space of even simple latent functions is very large, the general approach to solving this problem is to utilize "basis functions." For example, in communication and signal processing, the harmonic or Fourier representation of a time series has been widely utilized, due to the fact that signals communicated are periodic in nature. The approximation of stationary processes via harmonics or Autoregressive Integrated Moving Averages ("ARIMA") has made them a popular model class to learn stationary-like time series, with domain specific popular variations, such as Autoregressive Conditional Heteroskedasticity ("ARCH") in finance. To capture non-stationary or trend-like behavior, polynomial bases have been considered. There are rich connections to the theory of stochastic processes and information theory. Popular time series models with latent structure are the Hidden Markov Model ("HMM") in its probabilistic form and the Recurrent Neural Network ("RNN") in its deterministic form. Simple model functions such as these are valuable, in part, to suggest a physical mechanism by which these processes take place.

There are various techniques for analyzing time series when the observed data are both complete and noiseless. For example, Singular Spectrum Analysis (SSA) of time series is well known. The core steps of SSA for a given time series are as follows: (1) create a Hankel matrix from the time series data, (2) perform a Singular Value Decomposition (SVD) of the Hankel matrix; (3) group the singular values based on a user belief of the model that generated the process; (4) perform diagonal averaging for the "Hankelization" of the grouped rank-1 matrices outputted from the SVD to create a set of time series; and (5) learn a linear model for each "Hankelized" time series for the purpose of forecasting. However, when measurement data are either noisy or missing, other techniques may (and sometimes must) be used.

The problem of recovering hidden state from noisy observations is quite prevalent and a workhorse of classical systems theory. For example, most of the system identification literature focuses on recovering model parameters of an HMM. While Expectation-Maximization ("EM") and the well-known Baum-Welch algorithm are the go-to approaches, knowledge of the underlying model is required (as is the case with SSA). For instance, one technique has proposed an optimization based, statistically consistent estimation method. However, the optimization "objective" encodes knowledge of the precise underlying model. Moreover, there is limited theoretical understanding behind the correctness of such inexact algorithms. In fact, convergence of the Baum-Welch algorithm to yield a solution at all was only recently proven.

The problem of modeling time series from missing data has received comparatively less attention. A common approach is to utilize HMMs or general State-Space-Models to learn with missing data. Most of the work within this literature appears to be restricted to such class of models, once again requiring assumptions about the underlying modeling function. Recently, building on the literature in online learning, sequential approaches have been proposed to address prediction with missing data.

Time series data are, fundamentally, one-dimensional—the data are obtained in a sequence of time. However, the use of a matrix structure for time series analysis has been seen in the literature, in roughly two streams of prior works: Singular Spectrum Analysis for a single (fully observed, noiseless) time series mentioned above, and the use of multiple time series. Recently, multiple time series have been viewed in a matrix form with the goal of primarily imputing (filling in) missing values or de-noising values that are present by using the matrix structure to meaningfully compare multiple time series against each other. However, like SSA, EM, and Baum-Welch, these approaches require assumptions on the underlying model. For example, one such algorithm changes based on the user's belief in the model that generated the data along with the multiple time series requirement.

All of the above approaches thus require some knowledge of, or assumptions about, the underlying physical process model.

SUMMARY OF DISCLOSED EMBODIMENTS

Described herein are concepts, systems and techniques to model a time series from missing data by imputing missing values, denoising measured but noisy values, and forecasting future values of a single time series, without knowledge of (and making only minimal assumptions about) an underlying physical model, and without knowledge of a noise distribution. Disclosed concepts, structures, and techniques operate by transforming an observed time series, which is potentially incomplete and/or noisy, into a non-overlapping matrix having a certain relationship between the number of rows and columns. Matrix estimation methods are applied to recover an underlying mean matrix, which encodes the latent or hidden state of the underlying process. The estimation process simultaneously imputes missing values and denoises existing values. Forecasting may be performed using the imputed, denoised mean matrix. This results in a forecasting system and technique having a statistical error which is less than a statistical error achieved by conventional forecasting systems and techniques.

Two important results may be proven about the effectiveness of disclosed embodiments as improvements over the prior art, provided that both the underlying latent function $f$ and the observed data function X have certain statistical and time-shifting properties. The first result is that there is a theoretical reduction in computational complexity of modeling, especially for imputing missing data and denoising data; that is, disclosed embodiments are more efficient than prior art systems at these tasks. The second result is that the mean-squared error in forecasting decays to zero as more data are collected; that is, disclosed embodiments become more accurate over time. The proofs may be found in https://arxiv.org/abs/1802.09064, a publication by the inventors that is incorporated herein by reference in its entirety.

At the core of the proofs of these results is a representation theorem which states that, for several classes of widely-used model functions, the transformed matrix is (approximately) low-rank. This, in effect, generalizes the widely used Singular Spectrum Analysis (SSA) in the time series literature, and establishes a rigorous link between time series analysis and matrix estimation. Through synthetic and real-world datasets, disclosed embodiments outperform standard software packages (including R libraries) in the presence of missing data as well as high levels of noise and their additive mixtures.

As mentioned above, disclosed embodiments are model agnostic with respect to both the underlying time dynamics and observational noise. Being noise agnostic makes embodiments applicable to settings where the state is hidden, and only noisy observations are available, as in a Hidden Markov Model. This occurs, for example, when embodiments observe a Poisson process having a time-varying parameter, and recover the time-varying parameter accurately-without knowing that the process is Poisson. These properties also allow forecasting embodiments to perform regression with noisy features, as in error-in-variable regression, with increasing accuracy over time.

Thus, a first embodiment is a system for estimating latent values of a physical process. The system includes a data buffer, a representation processor coupled to the data buffer, an imputation and denoising circuit coupled to the representation processor, and an estimated means memory coupled to the imputation and denoising circuit. The data buffer is configured for receiving a first time series of noisy, partial measured values of the physical process. Each such value has a given probability of measurement according to an independent, random statistical distribution having a uniformly bounded variance and a mean equal to a corresponding latent value of the physical process. The representation processor is configured for accessing the first time series using a non-overlapping matrix representation. The imputation and denoising circuit is configured for estimating a mean matrix of the non-overlapping matrix according to an exact or approximate rank of the non-overlapping matrix that is less than both its number of rows and its number of columns. Finally, the estimated means memory is configured for storing entries of the mean matrix as a second time series of imputed and denoised latent values of the physical process.

In some embodiments, the physical process comprises a linear recurrent function, a function with compact support, a finite sum of sublinear trend functions, or an additive combination of any of these.

In some embodiments, the representation processor comprises data indicating a number of rows and a number of columns of the non-overlapping matrix representation and an address generator for indexing the data buffer according to row and column indices.

Some embodiments include a matrix memory for storing the non-overlapping matrix, and the representation processor is configured to transform the first time series in the data buffer into a Chinese page matrix in the matrix memory.

In some embodiments, the imputation and denoising circuit is configured for estimating the mean matrix by a three step process. The first step is factoring the non-overlapping matrix as a product of a first unitary matrix, a diagonal matrix, and a second unitary matrix, wherein entries of the diagonal matrix are singular values of the first matrix. The second step is forming a reduced diagonal matrix by eliminating zero or more diagonal entries according to a threshold. The third step is estimating the mean matrix as the product of the first unitary matrix, the reduced diagonal matrix, and the second unitary matrix.

Some embodiments that provide forecasting include a regression processor coupled to the imputation and denoising circuit and a forecasting processor coupled to the regression processor and estimated means memory. The regression processor is configured for performing a linear regression on a row of the mean matrix with respect to other rows in the mean matrix, to thereby produce a regression vector having length L. The forecasting processor is configured for computing an inner product of the regression vector with the last L−1 estimated means, to thereby predict a future value of the physical process.

Another embodiment is a method of estimating latent values of a physical process. The method includes, in a data buffer, receiving a first time series of noisy, partial measured values of the physical process, wherein each such value has a given probability of measurement according to an independent, random statistical distribution having a uniformly bounded variance and a mean equal to a corresponding latent value of the physical process. The method also includes, by a representation processor, accessing the first time series using a non-overlapping matrix representation. The method further includes, by an imputation and denoising circuit, estimating a mean matrix of the non-overlapping matrix according to an exact or approximate rank of the non-overlapping matrix that is less than both its number of rows and its number of columns. The method finally includes, in an estimated means memory, storing entries of the mean matrix as a second time series of imputed and denoised latent values of the physical process.

In some embodiments, the physical process comprises a linear recurrent function, a function with compact support, a finite sum of sublinear trend functions, or an additive combination of any of these.

In some embodiments, accessing the first time series using a non-overlapping matrix representation includes indexing the data buffer according to row and column indices of the matrix representation.

In some embodiments, accessing the first time series using a non-overlapping matrix representation includes transforming the first time series in the data buffer into a Chinese page matrix in the matrix memory.

In some embodiments, estimating the mean matrix comprises a three step process. The first step is factoring the non-overlapping matrix as a product of a first unitary matrix, a diagonal matrix, and a second unitary matrix, wherein entries of the diagonal matrix are singular values of the first matrix. The second step is forming a reduced diagonal matrix by eliminating zero or more diagonal entries according to a threshold. The third step is estimating the mean matrix as the product of the first unitary matrix, the reduced diagonal matrix, and the second unitary matrix.

Some embodiments that provide forecasting include two additional steps. The first step is performing a linear regression on a row of the mean matrix with respect to other rows in the mean matrix, to thereby produce a regression vector having length L. The second step is computing an inner product of the regression vector with the last L−1 estimated means, to thereby predict a future value of the physical process.

Another embodiment is a tangible, computer-readable storage medium, in which is non-transitorily stored computer program code for performing any one or more of the above-described method embodiments.

It is appreciated that the concepts, techniques, and structures described herein may be embodied in other ways not summarized above.

DESCRIPTION OF THE SEVERAL VIEWS OF THE DRAWINGS

The manner and process of making and using the disclosed embodiments may be appreciated by reference to the drawings, in which.

DETAILED DESCRIPTION OF DISCLOSED EMBODIMENTS

Figure 2:
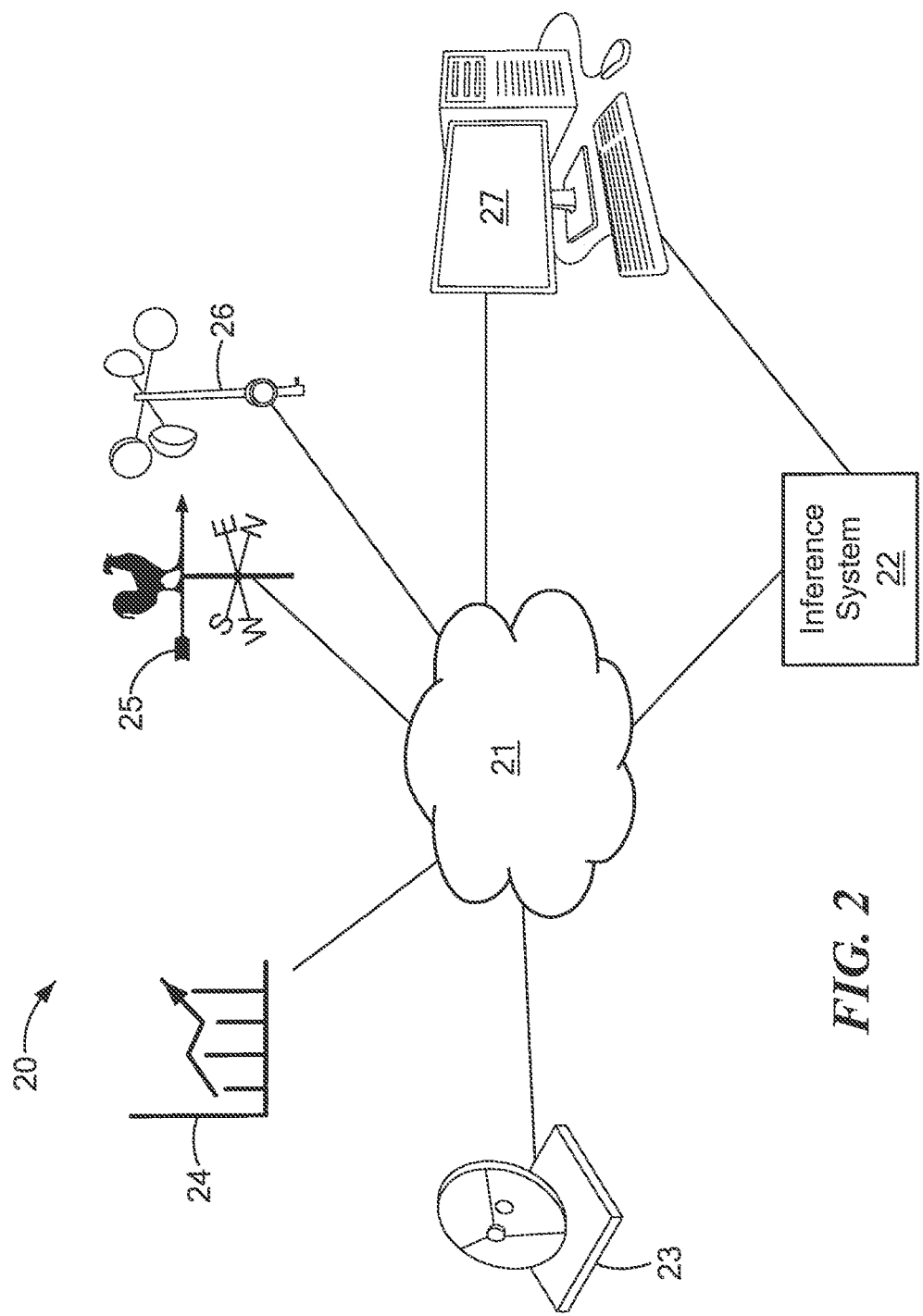
FIG. 2 is a block diagram illustrating an environment in which an inference system may operate.

Referring now to FIG. 2, a system embodiment is shown in a typical environment 20 in which a problem of time series analysis may occur. The environment 20 includes a data communication network 21, such as the public Internet, a private local access network (LAN), or similar network. The data communication network 21 permits data communication between an inference system 22 that embodies the concepts, structures, and techniques disclosed herein, and a number of data observation or measurement sources, such as an antenna 23, a financial data tool 24, weather instruments 25 and 26, and computer (or more generally processing system) 27.

In some situations, the computer 27 may communicate directly with the inference system 22, as indicated, or the inference system 22 may form part of the computer 27 or use a portion of the hardware and/or software of the computer 27 to perform its functions. FIG. 2 is merely representative of one possible environment 20 in which an inference system 22 may be present, and it is appreciated that in other applications or in other embodiments, an inference system 22 may not be coupled to a public data communication network 21 at all, or may be used with other data measurement sources. For example, an inference system which may be the same as or similar to inference system 22, may be used in a wide variety of applications and systems including, but not limited to: signal processing systems, pattern recognition systems, weather forecasting systems, earthquake prediction systems, electroencephalography systems, control engineering systems, astronomy systems, communications engineering systems, and largely in any domain of applied science and engineering which involves temporal measurements.

An illustrative processing system 30, which may be the same as or similar to computer 27, is described below in connection with FIG. 3.

Figure 1:
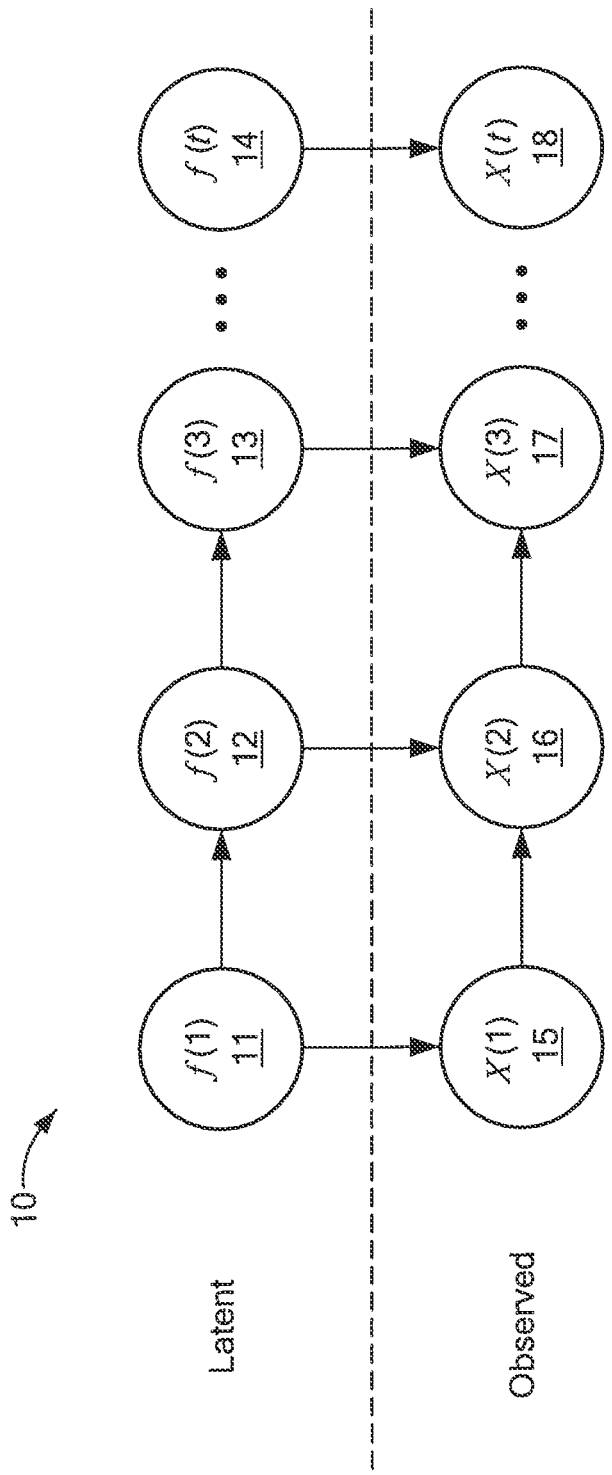
FIG. 1 is a block diagram illustrating the problem of time series analysis as known in the art.
Figure 4:
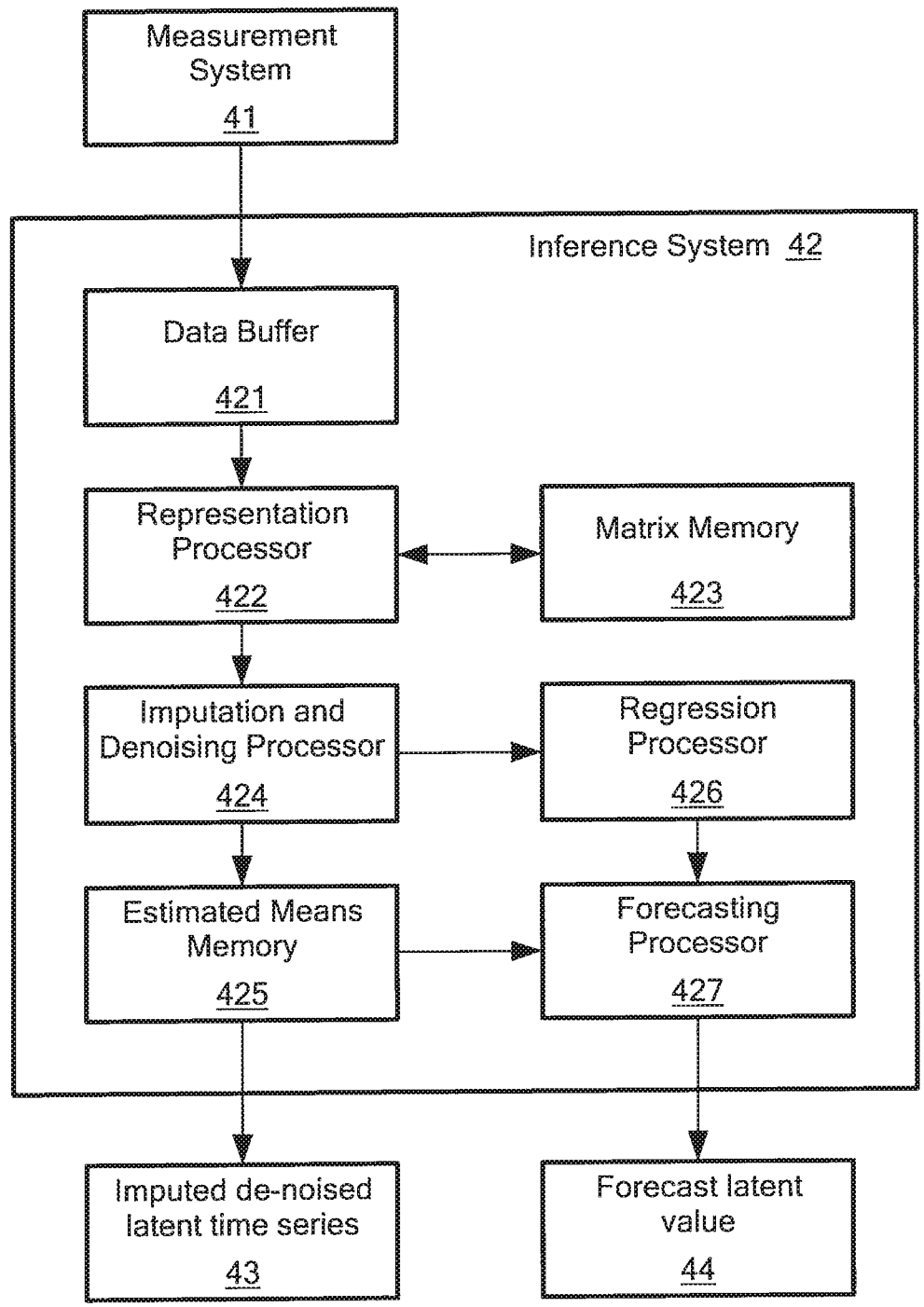
FIG. 4 is a block diagram of an illustrative inference system in accordance with an embodiment.

FIG. 4 schematically shows relevant hardware or functional components of an inference system 42 of an embodiment, and their respective relationships. The inference system 42 receives observational data from a measurement system 41, in the form of a time series of noisy, partial measured values of a process. It is appreciated that the process may be physical (comprising e.g. weather data) or artificial (comprising e.g. financial data) or a mixture of both, and that a wide variety of measurement systems 41 may be used with the inference system 42. The observational data may be, for example, observations 15, 16, 17, and 18 shown in FIG. 1, or time series data received from antenna 23, financial data tool 24, weather instruments 25 and 26, or computer 27, or other time series data.

The inference system 42 produces as output an imputed, de-noised latent time series 43. The latent time series 43 may be (or may approximate), for example, the values 11, 12, 13, and 14 of FIG. 1. Optionally, the inference system 42 may produce as a second output one or more forecast latent values 44. Thus, if the input to the inference system 42 comprises observational data 15, 16, and 17 only, then the inference system 42 may output not only inferred latent values 11, 12, and 13, but may also output latent value 14 as a forecasted value.

The inference system 42 has several functional components, including a data buffer 421 for receiving the time series of measurements from the measurement system 41. The data buffer 421 may be, for example, any sort of computer memory, including linear addressable memory. In particular, each received value may be indexed in a separate buffer location according to a timestamp or other index. In such embodiments, missing values may be represented by a special value stored at a particular addressed location, or may be omitted entirely from storage.

The inference system 42 includes a representation processor 422 for accessing the first time series using a non-overlapping matrix representation, and in particular as a Chinese page matrix. In some embodiments, the first time series is accessed directly in the data buffer 421. To accomplish this, the representation processor 422 maintains data indicating a number of rows and a number of columns of the non-overlapping matrix representation, and includes or accesses an address generator for indexing the data buffer according to logical row and column indices. In this way, the inference system 42 need not copy the received data from the data buffer 421 to operate on it, improving processing speed.

In some embodiments, the first time series is copied out of the data buffer into an optional matrix memory 423. That is, the representation processor 422 copies blocks of consecutive values from the time series into a separate memory, that may be designed for rapid data reading and writing using separate row and column indices. In accordance with the concepts, structures, and techniques disclosed herein, the representation processor may transform the first time series in the data buffer into a Chinese page matrix in the matrix memory.

The inference system 42 includes an imputation and denoising processor 424 for estimating a mean matrix of the non-overlapping matrix. According to the concepts and techniques disclosed herein, observations of many families of processes yield a non-overlapping matrix having a relatively low rank. Some of these processes include linear recurrent functions, functions with compact support, finite sums of sublinear trend functions, and additive combinations of these. In particular, the rank of the non-overlapping matrix may be significantly less than both its number of rows and its number of columns.

It is appreciated that the imputation and denoising processor 424 may employ any of a variety of matrix estimation techniques, including but not limited to singular value thresholding. In case the non-overlapping matrix does not have a low rank, it may be the case that some of its singular values are particularly small, so that the matrix has approximately low rank. That is, estimating the mean matrix may include performing a singular value thresholding by factoring the non-overlapping matrix as a product of a first unitary matrix, a diagonal matrix, and a second unitary matrix. The entries on the diagonal matrix are then the singular values of the first matrix. Eliminating or zeroing out some of these diagonal entries that are less than a threshold may be done to reduce the rank. Then multiplying the factor matrices back produces the estimated mean matrix.

The inference system 42 includes an estimated means memory 425 for storing entries of the mean matrix as a second time series of imputed and denoised latent values of the physical process. The estimated means memory 425 may be a matrix memory, in which case the imputation and denoising processor 424 may output the mean matrix in Chinese page form. Alternately, the estimated means memory 425 may be a linear addressable memory like the data buffer 421, in which case the imputation and denoising processor 424 may first transform the mean matrix from two-dimensional Chinese page format into a one-dimensional time series format before storing it in the memory 425.

The above-described inference system 42 already is adequate to perform imputation and denoising of noisy, partially observed time series data for a wide variety of processes. However, some embodiments also perform forecasting of future latent values. In this connection, the inference system 42 may include a regression processor 426 and a forecasting processor 427.

The regression processor 426 is used for performing a linear regression on a row of the mean matrix with respect to other rows in the mean matrix. Thus, the regression processor 426 receives as input the mean matrix, and outputs a regression vector having a length L equal to the number of rows of the mean matrix. The forecasting processor 427 is used for computing an inner product of the regression vector with the last L−1 estimated means. Thus, the forecasting processor 427 receives as input the mean matrix and the regression vector, and outputs a future value of the physical process.

It is appreciated that each above-described component may be implemented in hardware, firmware, software, or a combination of these. It is also appreciated that the functions of the components may be combined in a single physical or logical embodiment, or distributed among several such embodiments.

Figure 5:
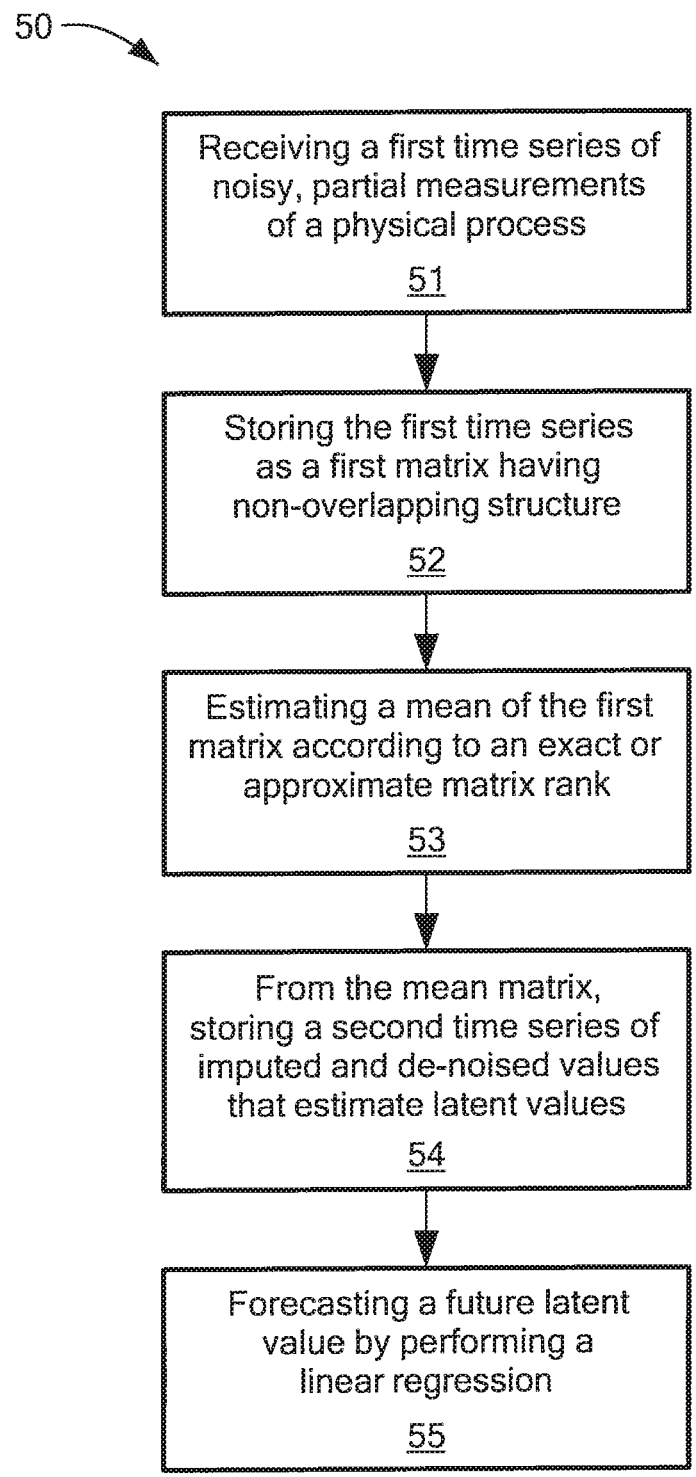
FIG. 5 is a flow diagram for a method of performing inference processing according to an embodiment.
Figure 6:
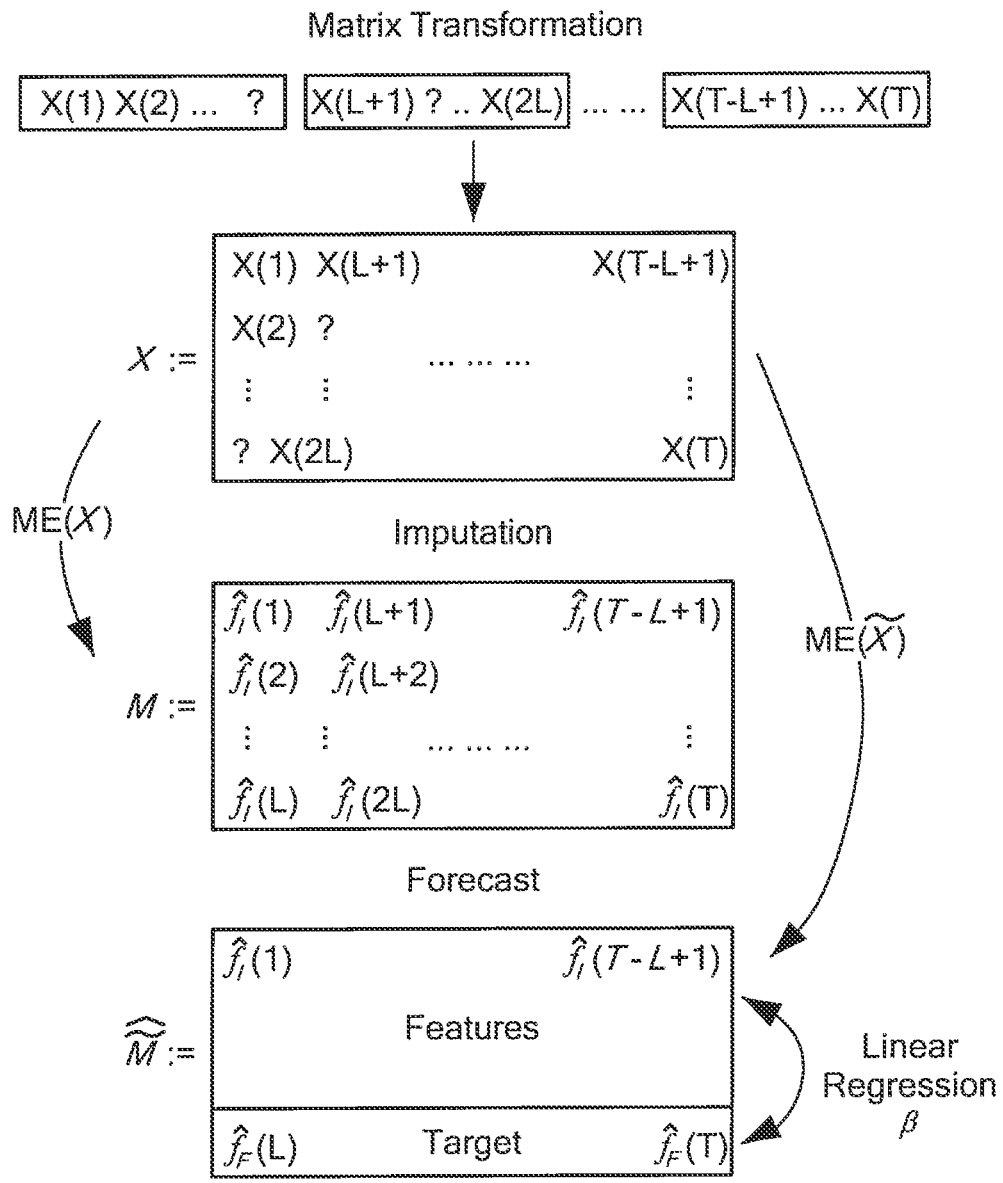
FIG. 6 caricatures imputation and forecasting algorithms according to an embodiment.

FIG. 5 is a flow diagram for a method 50 of performing inference processing according to an embodiment. The method 50 may be performed, for example, on a time series of noisy, partial measurements of a physical process, such as time series 15, 16, 17, 18 of FIG. 1. The method 50 may produce a time series of imputed and denoised values that estimate the latent values of the physical process, such as time series 11, 12, 13, 14 of FIG. 1. The method 50 may be performed by an inference processor, such as inference processor 27 of FIG. 2 or inference processor 42 of FIG. 4, or by a general purpose computer such as computer 30 of FIG. 3, described below. It is appreciated that the method 50 may be performed on hardware, firmware, software, or a combination of these, even if the particular combination is not expressly disclosed herein.

The method 50 has a first process 51, which includes receiving the time series. To take advantage of the concepts, structures, and techniques disclosed herein, wherein each value in the time series has a given probability of measurement according to an independent, random statistical distribution having a uniformly bounded variance. Each value also has a mean equal to a corresponding latent value of the physical process.

The method 50 has a second process 52, which includes storing the first time series as a first matrix having non-overlapping structure. The importance of using a non-overlapping structure, as opposed to a Hankel matrix, is described below in more detail.

The method 50 has a third process 53, which includes estimating a mean of the first matrix according to an exact or approximate matrix rank. It is appreciated that a wide variety of matrix estimation techniques may be used, and that the disclosed method 50 may increase in efficiency as new techniques are developed. However, for concreteness, singular value thresholding may be used.

The method 50 has a fourth process 54, which includes storing a second time series of imputed and denoised values that estimate latent values of the underlying process. Such latent values correspond timewise to respective measured or observed values.

In some forecasting embodiments, the method 50 has a fifth process 55, which includes forecasting a future latent value of the underlying process by performing a linear regression. The linear regression yields a regression vector as described above in connection with regression processor 426, which may be used to forecast a future value as described above in connection with forecasting processor 427.

The operation of various embodiments is now described in more detail. Specifically, consider a discrete-time setting with $t \in \mathbb{Z}$ representing the time index and $f: \mathbb{Z} \to \mathbb{R}$ representing the latent discrete-time time series of interest, where $\mathbb{R}$ is the field of real numbers and $\mathbb{Z}$ is the ring of integers. For each $t \in [T] := \{1, \ldots, T\}$ and with probability $p \in (0,1]$, one observes the random variable $X(t)$ whose statistical expected value is given by $\mathbb{E}[X(t)] = f(t)$. That is to say, while the observed value $X(t)$ at any given time may not always equal the underlying latent value $f(t)$, the average of possible observed values, weighted by the probability that they might be observed, does equal the underlying latent value. While the underlying mean signal $f$ is strongly correlated, assume the per-step noise is independent across $t$ and has uniformly bounded variance. Under this setting, there are two objectives: (1) interpolation, i.e., estimate $f(t)$ for all $t \in [T]$; (2) extrapolation, i.e., forecast $f(t)$ for $t > T$.

In accordance with the concepts, structures, and techniques disclosed herein, embodiments perform interpolation and extrapolation using matrix estimation. In the matrix estimation setting, there is a "parameter" matrix M of interest, and one observes a sparse, corrupted signal matrix X where $\mathbb{E}[X] = M$; the aim then is to recover the entries of M from noisy and partial observations given in X.

As used herein, the notation $[N] = \{1, \ldots, N\}$ and $X[s:t] = [X(s), \ldots, X(t)]$ for any $s \le t$. For any vector $v \in \mathbb{R}^n$, denote its Euclidean ($\ell_2$) norm by $v_2$, and define $v_2^2 = \Sigma_{i=1}^n v_i^2$. Furthermore, define $L > 1$ to be an algorithmic hyperparameter and $N = \lceil T/L \rceil - 1$. For any L×N matrix A, let $A_L = [A_{Lj}]_{j \le N}$ represent the last row of A, and let $\tilde{A} = [A_{ij}]_{i < L, j \le N}$ denote the (L−1)×N submatrix obtained by removing the last row of A.

The algorithm begins by introducing the crucial step of transforming a single, univariate time series into a matrix. Given time series data X[1:T], construct L different L×N matrices $X^{(k)}$, defined as $$X^{(k)} = [X_{ij}^{(k)}] = [X(i + (j-1)L + (k-1))]_{i \le L, j \le N},$$

where $k \in [L]$. In words, $X^{(k)}$ is obtained by dividing the time series into N non-overlapping contiguous intervals each of length L, thus constructing N columns; for $k \in [L]$, $X^{(k)}$ is the k-th shifted version with starting value X(k). For the purpose of imputation, only $X^{(1)}$ is used. In the case of forecasting, however, utilize $X^{(k)}$ for all $k \in [L]$ is used. Define $M^{(k)}$ analogously to $X^{(k)}$ using $f(t)$ instead of $X(t)$.

Imputation.

Due to the matrix representation $X^{(1)}$ of the time series, the tasks of imputing missing values and de-noising observed values translates to that of matrix estimation.

1. Transform the data X[1:T] into the matrix $X^{(1)}$ as described above.

2. Apply a matrix estimation method ME to produce $\hat{M}^{(1)} = ME(X^{(1)})$.

3. Produce estimate: $\hat{f}_I(i+(j-1)L) := \hat{M}_{ij}^{(1)}$ for $i \in [L]$ and $j \in [N]$.

Forecasting.

In order to forecast future values, first de-noise and impute via the procedure outlined above, and then learn a linear relationship between the last row and the remaining rows through linear regression.

4. For $k \in [L]$, apply the imputation algorithm to produce $\hat{\tilde{M}}^{(k)}$ from $\tilde{X}^{(k)}$.

5. For $k \in [L]$, define $$\hat{\beta}^{(k)} := \arg\min_{v \in \mathbb{R}^{L-1}} X_L^{(k)} - (\hat{\tilde{M}}^{(k)})^T v_2^2.$$

6. Produce the estimate at time $t > T$ as follows:

Let $v_t := [X(t-L+1) : X(t-1)]$ and $k = (t \mod L) + 1$.

Let $v_t^{proj} := \arg\min_{v \in \mathbb{R}^{L-1}} v_t - (\hat{\tilde{M}}^{(k)})^T v_2^2$.

Produce estimate: $\hat{f}_F(t) := (v_t^{proj})^T \cdot \hat{\beta}^{(k)}$.

The number of rows L of the transformed matrix should be as large as possible, with the requirement $L = o(N)$. Thus, it suffices to let $N = L^{1+\delta}$ for any $\delta > 0$, e.g., $N = L^2 = T^{2/3}$.

The matrices $X^{(k)}$ and $M^{(k)}$ must have certain properties to identify the time series models $f$ for which disclosed embodiments provides an effective method for imputation and prediction. These properties are as follows:

Property 1. Let matrices $X^{(1)}$ and $M^{(1)}$ satisfy the following:

A. For each $i \in [L]$ and $j \in [N]$:
  $X_{ij}^{(1)}$ are independent random variables satisfying $\mathbb{E}[X_{ij}^{(1)}] = M_{ij}^{(1)}$ and $\text{Var}(X_{ij}^{(1)}) \leq \sigma^2$.
  $X_{ij}^{(1)}$ is observed with probability $p \in (0,1]$, independent of other entries.

B. There exists a matrix $M_{(r)}$ of rank $r$ such that for $\delta_1 \geq 0$, $$\|M^{(1)} - M_{(r)}\|_{\max} \leq \delta_1.$$

Property 2. For $k \in [L]$, let matrices $X^{(k)}$ and $M^{(k)}$ satisfy the following:

A. For each $i \in [L]$ and $j \in [N]$:
  $X_{ij}^{(k)} = M_{ij}^{(k)} + \epsilon_{ij}$, where $\epsilon_{ij}$ are independent sub-Gaussian random variables satisfying $\mathbb{E}[\epsilon_{ij}] = 0$ and $\text{Var}(\epsilon_{ij}) \leq \sigma^2$.
  $X_{ij}^{(k)}$ is observed with probability $p \in (0,1]$, independent of other entries.

B. There exists a $\beta^{*(k)} \in \mathbb{R}^{L-1}$ with $\|\beta^{*(k)}\|_1 = C_{\beta^{(k)}}$ for some constant $C_{\beta^{(k)}} > 0$ and $\delta_2 \geq 0$ such that $$\|M_L^{(k)} - (\tilde{M}^{(k)})^T \beta^{*(k)}\|_2 \geq \delta_2.$$

The above-described algorithm has several advantages, as now described.

Noisy Regression.

The forecasting algorithm as described above effectively performs regression when observations of features are both missing and noisy. In literature, this is known as error-in-variable regression. Recently, there has been exciting progress to understand this problem especially in the high-dimensional setting. Disclosed embodiments provide a solution for the high-dimensional setting through matrix estimation: perform matrix estimation on noisy, missing observations of features and then perform least squares. If the feature matrix can be approximated by a low-rank matrix, then it leads to a consistent estimator. This, however, requires utilizing a non-standard error for matrix estimation: the max row sum error (MRSE) (see Property 2).

Which Models Satisfy the Requirement.

As mentioned above, the algorithm enjoys strong performance guarantees provided the underlying mean matrix induced by the time series $f$ satisfies certain structural properties (Properties 1, 2). A broad class of time series models that are commonly used meet the requirements of the three function classes listed above.

Linear Recurrent Functions (LRF) are defined, for $t \in \mathbb{Z}$, as $$f^{LRF}(t) = \sum_{g=1}^{G} \alpha_g f(t-g).$$

LRFs include the following important family of time series $-f$ which can be represented as a finite sum of products of exponentials ($\exp \alpha t$), harmonics ($\cos(2\pi\omega t + \phi)$) and finite degree polynomials ($P_m(t)$), i.e. $f(t) = \sum_{g=1}^{G} \exp \alpha_k t \cos(2\pi\omega_k t + \phi_k) P_{m_k}(t)$. Further, since stationary processes and $L_2$ integrable functions are well approximated by a finite summation of harmonics, LRFs encompass a vitally important family of models. For this model, the structural properties required from the time series matrix for both imputation and forecasting are satisfied.

However, there are many important time series models that do not admit a finite order LRF representation, yet are recoverable using disclosed concepts, structures, and techniques. A few toy examples of such $f$ include $\cos(\sin(t))$, $\exp(\sin^2(t))$, $\log t$, $\sqrt{t}$. Now a model $f$ composed of a finite summation of functions that exhibit periodicity, such as $\cos(\sin(t))$ and $\exp(\sin^2(t))$, have compact support, and due to the disclosed approximately low-rank representation result, all the desired structural properties hold. Further, a model $f$ composed of a finite summation of functions that do not scale (super-)linearly (e.g. $\log t$, $\sqrt{t}$) are indeed sublinear, and again the desired properties hold. Importantly, a finite mixture of the above processes possesses the necessary structural properties.

Recovering the Hidden State.

Disclosed embodiments, being noise and time-dynamics agnostic, makes it relevant to recover the hidden state from its noisy, partial observations as in a Hidden Markov-like Model. For example, imagine having access to partial observations of a time-varying Poisson process without knowledge that the process is Poisson. By applying the disclosed algorithm for imputation, one can recover the time-varying parameters of this process accurately and thus recover this hidden state. Applying an Expectation-Maximization (EM) algorithm would require knowledge of the underlying model being Poisson, and even then theoretical guarantees are not clear for such an approach. This is an exciting implication since the EM algorithm—which often lacks provable guarantees—is the only previously known generic algorithm that works well when the model relating the hidden and observed states is unknown. Disclosed embodiments, on the other hand, are still able to accurately and provably estimate the hidden states, and represent a clear contribution over these known methods.

Experiments

Using synthetic and real-world datasets, experiments established that the disclosed concepts and techniques outperform existing standard software packages (including R) for the tasks of interpolation and extrapolation in the presence of noisy and missing observations. When the data were generated synthetically, the prior art software package was "helped" by choosing the correct parametric model and algorithm, while the disclosed algorithm remained oblivious to the underlying model. Despite this obvious disadvantage, the disclosed algorithm continued to outperform the standard packages on missing data.

Empirical studies demonstrated that the disclosed imputation algorithm accurately recovers the hidden state, verifying theoretical imputation guarantees. Experiments on real-world and synthetic datasets were used to study the imputation and forecasting performance of tested embodiments for mixtures of time series processes, as the amount of missing data was varied.

Mixtures of Time Series Processes.

For the synthetically generated datasets, mixtures of harmonics, trend, and auto-regressive (AR) processes with Gaussian additive noise were used, since AR is effectively a noisy version of an LRF. When using real-world datasets, the underlying time series processes were unknown; however, they appeared to display periodicity, trend, and auto-regression.

Comparisons.

For forecasting, embodiments were compared to the state-of-the-art time series forecasting library of R, which decomposes a time series into stationary auto-regressive, seasonal, and trend components. The R library learns each component separately and combines them to produce forecasts. Given that the experimental synthetic and real-world datasets involved additive mixtures of these processes, the prior art analytic/synthetic process of the R library serves as a strong baseline against which to compare embodiments. Embodiments did not outperform optimal model-aware methods for single model classes with all data present, at least those used by the R package. However, these methods are not necessarily optimal with missing data or when data are generated by mixture of multiple model types, which is the setting in which the disclosed model-agnostic method outperforms the prior art. For imputation experiments, embodiments were tested against AMELIA II, which is an R-based package widely believed to produce excellent imputation performance.

Metric of Evaluation.

The metric of comparison was the root mean-squared error (RMSE).

Algorithmic Parameters.

For both imputation and forecasting, Singular Value Thresholding (SVT) was applied. A data-driven approach was used to choose the singular value threshold, $\mu$, and the number of rows in the time series matrix, L. Specifically, 30% of the training data were reserved for cross-validation to pick $\mu$ and L.

Summary of Results.

Details of all experiments are provided below. Recall p is the probability of observation of each datapoint.

Synthetic Data—

For forecasting, the forecast RMSE of tested embodiments vs. R's forecast library was determined (see above for how the synthetic data were generated). Embodiments outperformed the R's forecast library, especially under high levels of missing data and noise. For imputation, embodiments outperformed the imputation library AMELIA under all levels of missing data.

Real-World Data—

Two real world datasets were tested: (i) Bitcoin price dataset from March 2016 at 30 s intervals; and (ii) Google flu trends data for Peru from 2003-2012. In both cases, randomly missing data were introduced, then the algorithm and R's forecast library were used to forecast into the future. Corroborating the results from the synthetic data experiments, tested embodiments forecast RMSE better than the R library's algorithm.

Hidden State Model—

A time series was produced according to a Poisson process with time-varying parameters, which were hidden. These parameters evolved according to a mixture of time series processes, i.e. sum of harmonics and trends. These time-varying hidden parameters were estimated using one realization of integer observations, of which several were randomly missing. For p ranging from 0.3 to 1.0, the imputation RMSE was always <0.2 while the $R^2$ was always >0.8, which should be considered excellent, thus illustrating the versatility of the disclosed algorithm in solving a diverse set of problems.

Synthetically Generated Data

A mixture process of harmonics, trend and auto-regressive (AR) components was generated. The first 70% of the data points were used to learn a model (training). Point-predictions, i.e. forecasts, were performed on the remaining 30% of the data. In order to study the impact of missing data, each entry in the training set was observed independently with probability $p \in (0,1]$.

Forecasts.

Figure 7:
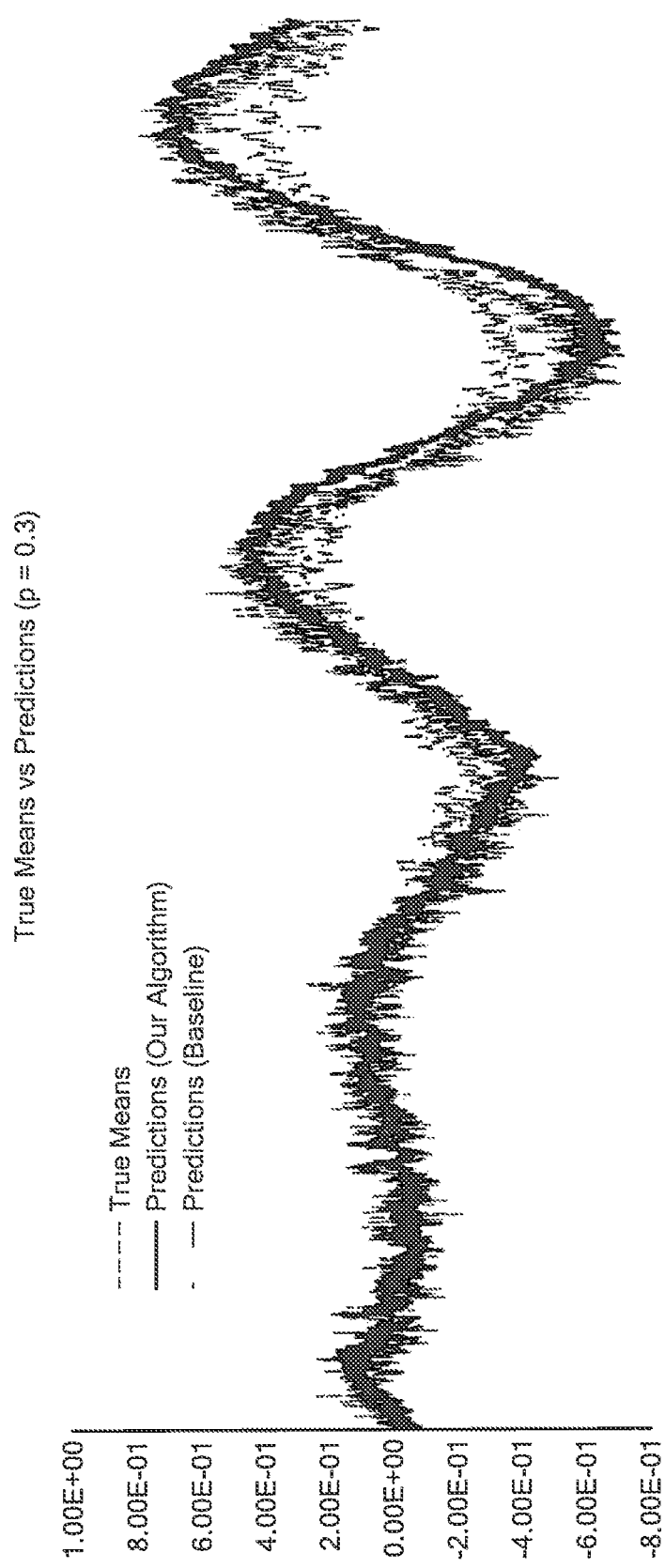
FIG. 7 is a plot comparing true versus predicted mean values according to an embodiment for a sample time series generated from a synthetic mixture of harmonic, trend, and auto-regressive components, with a probability of 30% that each data point was measured and not missing.
Figure 8:
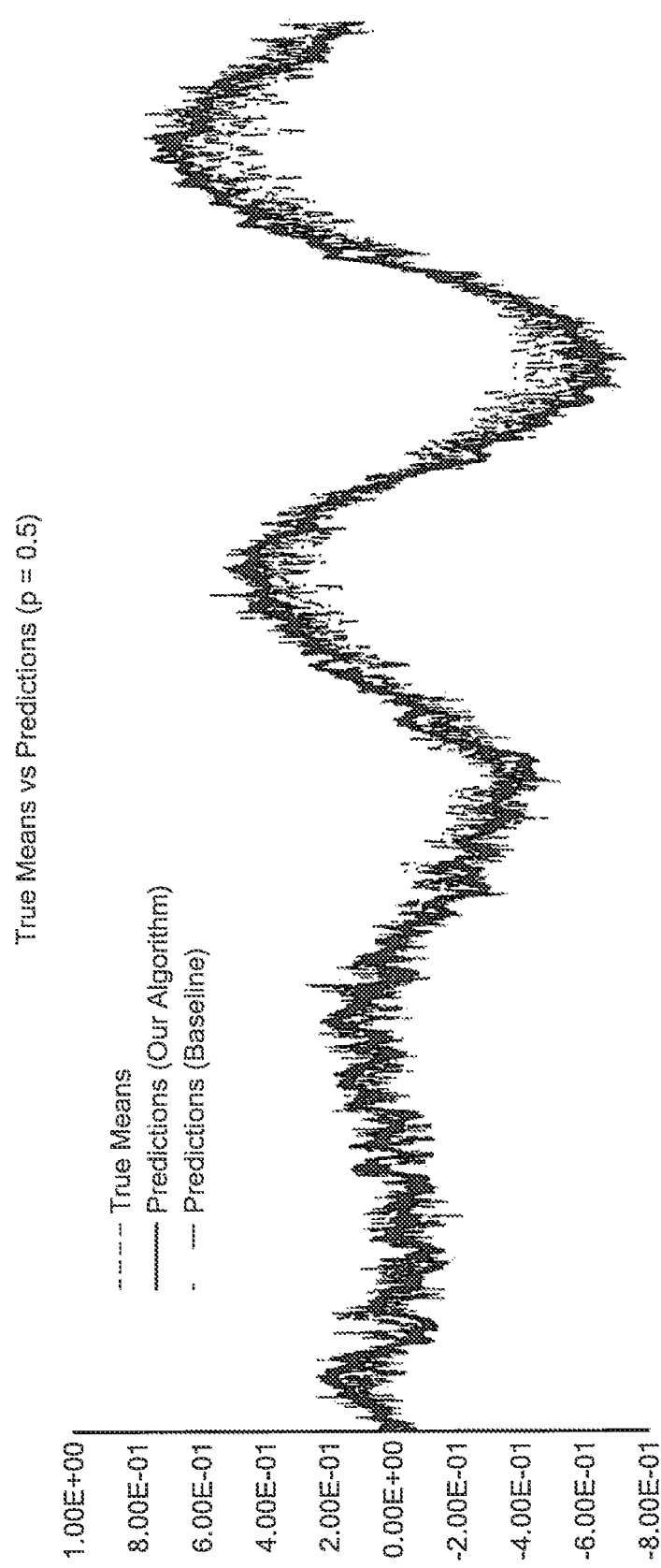
FIG. 8 is a plot comparing true versus predicted mean values according to an embodiment for a sample time series generated from a synthetic mixture of harmonic, trend, and auto-regressive components, with a probability of 50% that each data point was measured and not missing.
Figure 9:
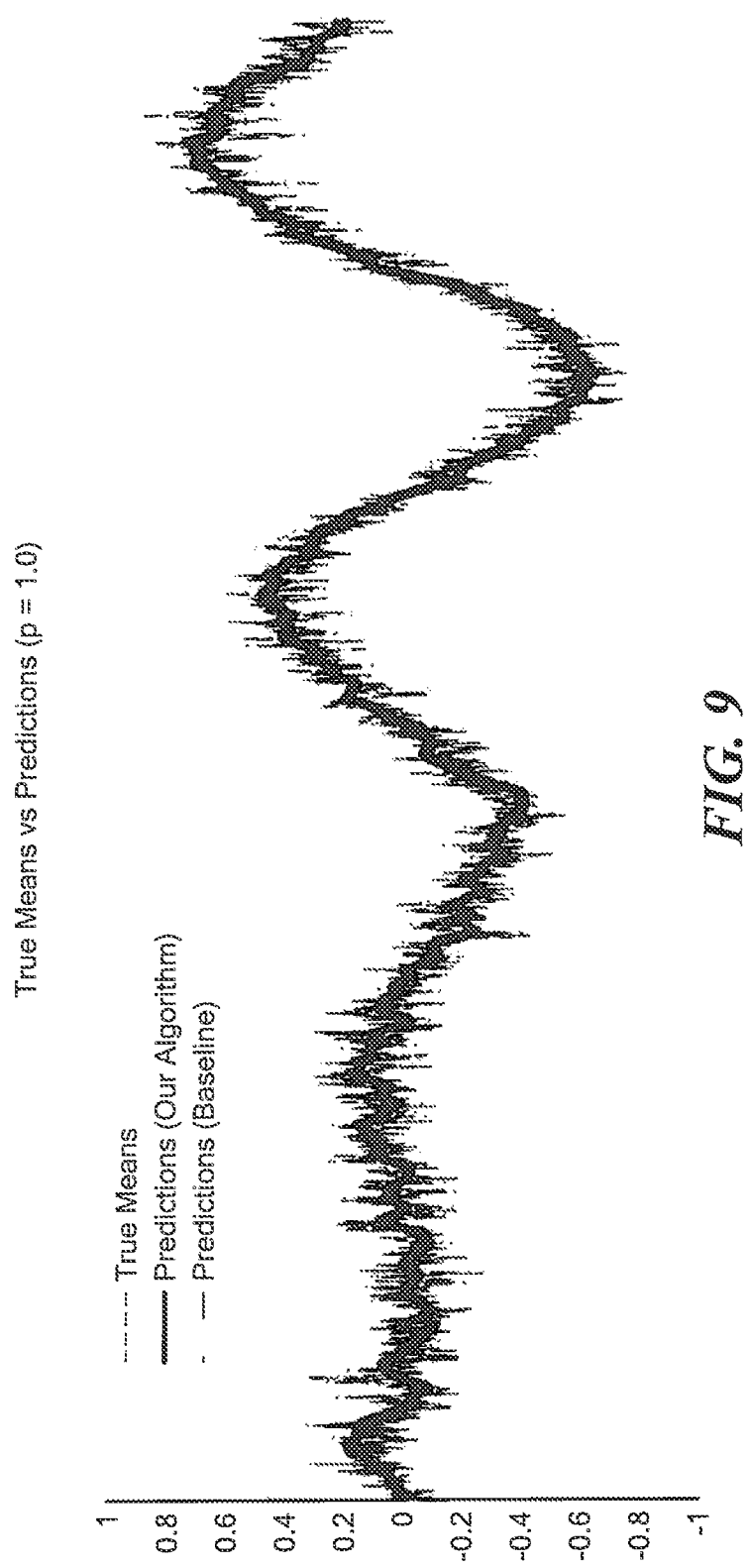
FIG. 9 is a plot comparing true versus predicted mean values according to an embodiment for a sample time series generated from a synthetic mixture of harmonic, trend, and auto-regressive components, with a probability of 100% that each data point was measured and not missing.
Figure 10:
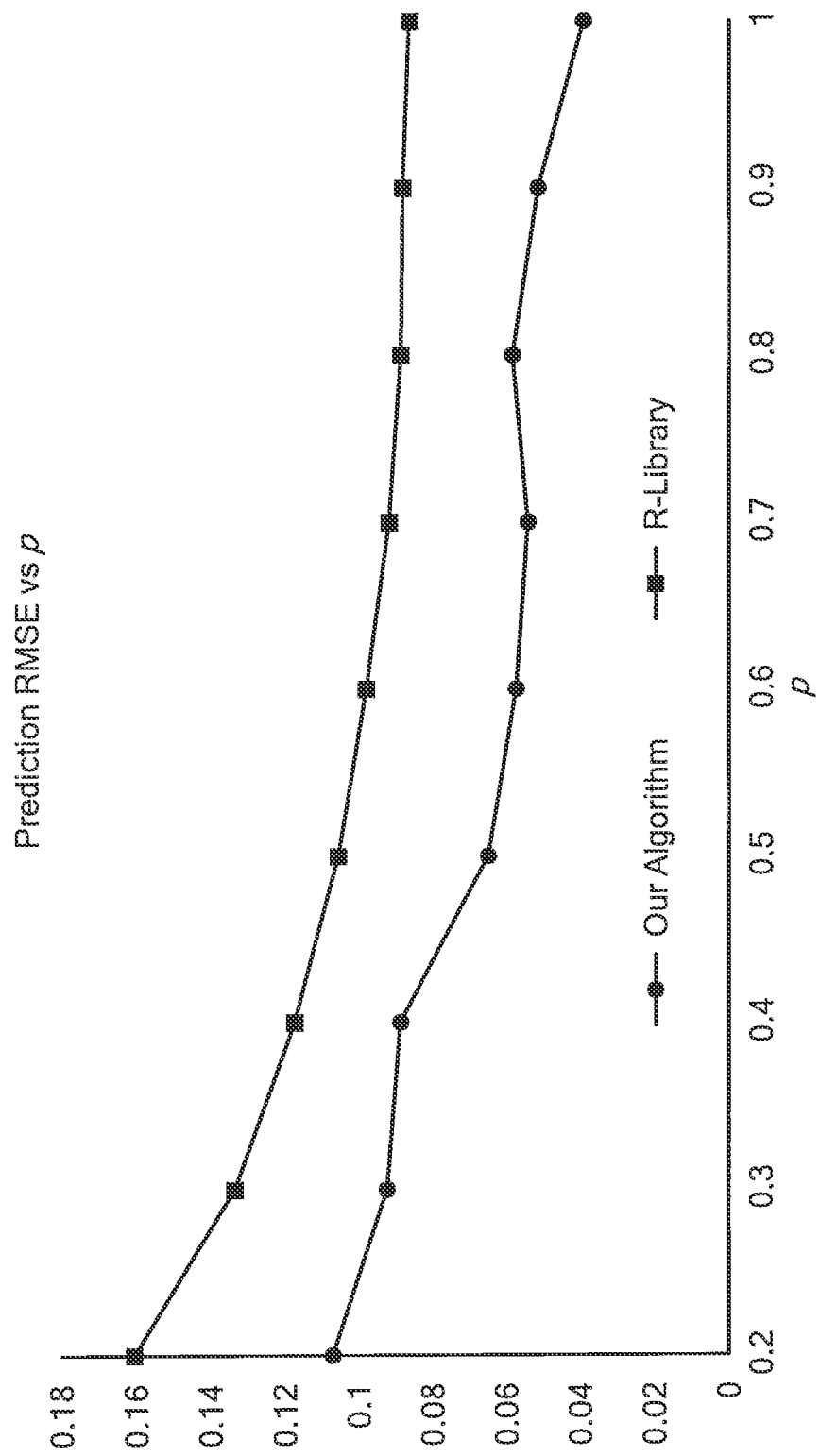
FIG. 10 is a plot comparing, for the data of FIGS. 7, 8, and 9, prediction RMSE versus data measurement probability when using the R library and an embodiment.

FIGS. 7, 8, and 9 visually depict the predictions from tested embodiments when compared to the state-of-the-art time series forecasting library in R, for observation success probabilities p=0.3, 0.5, and 1.0 respectively. The R library was given the number of lags of the AR component to search over, in effect making its job easier. Notice that the forecasts from the R library always experienced higher variance. As p became smaller, the R library's forecasts also contained an apparent bias. These visual findings are confirmed in FIG. 10, which shows that the disclosed algorithm produces better RMSEs than the R forecasting library when working with mixtures of AR, harmonic and trend processes. In particular, the disclosed algorithm's RMSE ranges from [0.03, 0.11] vs [0.09, 0.16] for R's forecasting library.

Imputation.

Figure 11:
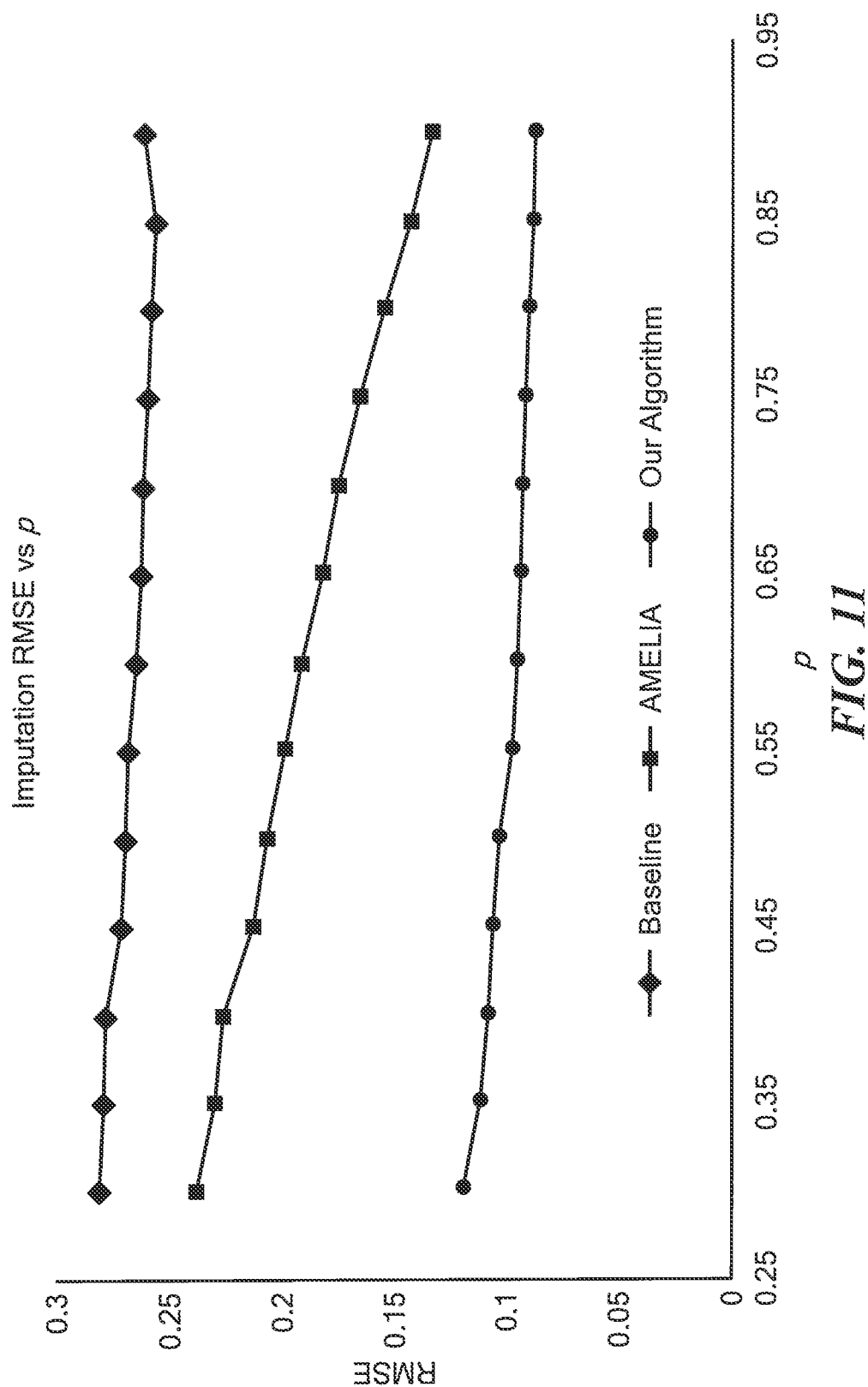
FIG. 11 is a plot comparing, for the data of FIGS. 7, 8, and 9, imputation root-mean-squared-error (RMSE) versus data measurement probability when using a baseline algorithm, the AMELIA library, and an embodiment.

FIG. 11 shows that tested embodiments outperformed the state-of-the-art AMELIA library for multiple time series imputation for all levels of missing data. The RMSE of the disclosed algorithm ranged between [0.09, 0.13] vs [0.14, 0.24] for AMELIA.

This experiment involved multiple time series where the outcome variable of interest and the logarithm of its squared power were also included. The additional time series components were included to help AMELIA impute missing values because it is unable to impute missing entries in a single time series. Note that AMELIA is much better than the baseline, i.e. imputing all missing entries with the mean. However, tested embodiments did not use these additional time series, and instead just used the original time series with missing, noisy observations.

Real-World Data

Two real-world datasets were used to evaluate the performance of embodiments in situations where the identities of the time series processes were unknown. This set of experiments highlights the versatility of the disclosed algorithm and applicability to practical scenarios involving time series forecasting. Note that for these datasets, the true mean processes were (and remain) unknown. Therefore, it is not possible to generate the metric of interest, i.e. RMSE, using the means. Instead, the observations themselves were used as the reference to compute the metric.

Bitcoin.

Figure 12:
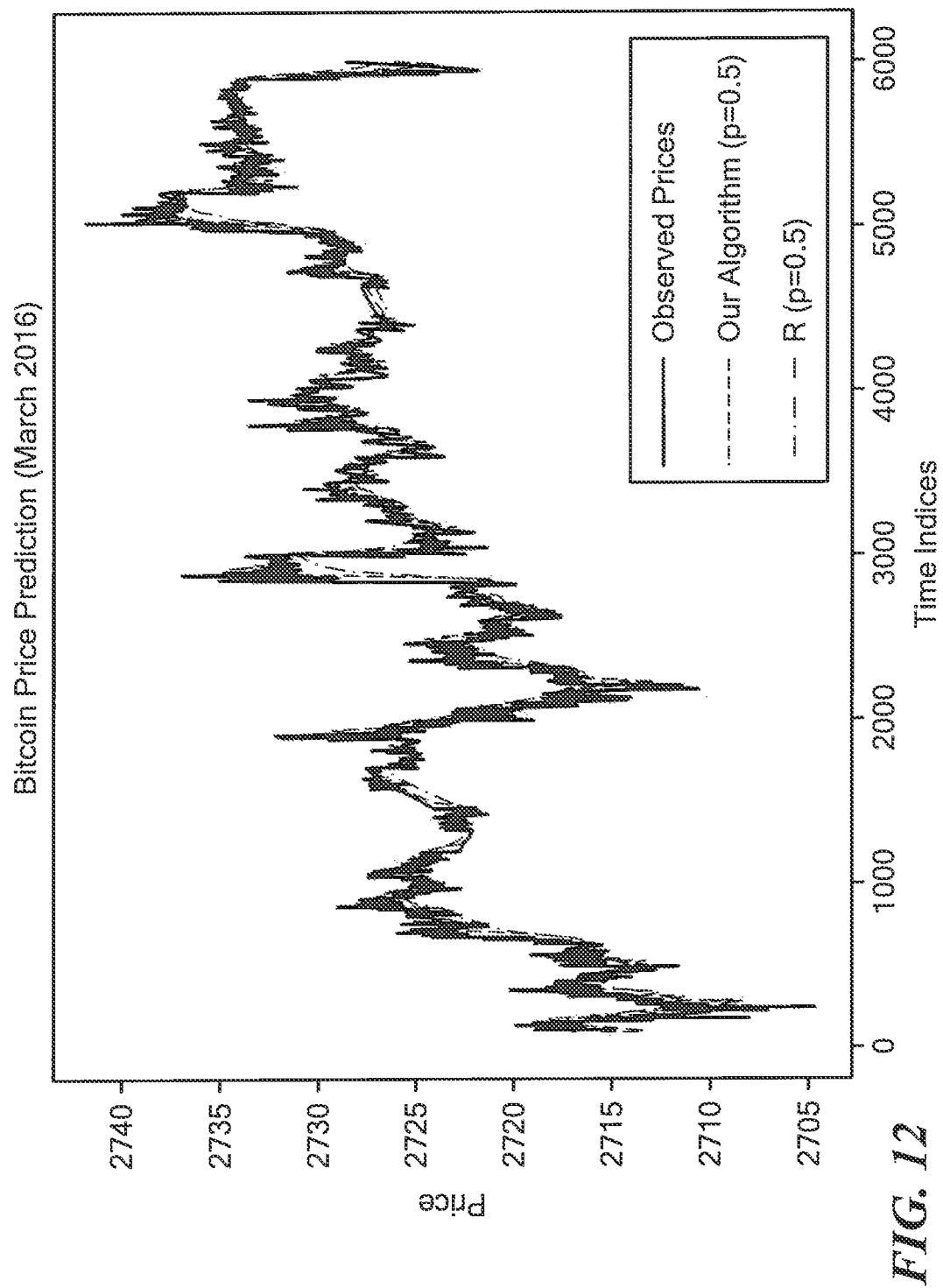
FIG. 12 is a plot comparing actual Bitcoin prices for the month of March 2016 with prices inferred (after observing 50% of the true data) using the R library and using an embodiment.
Figure 13:
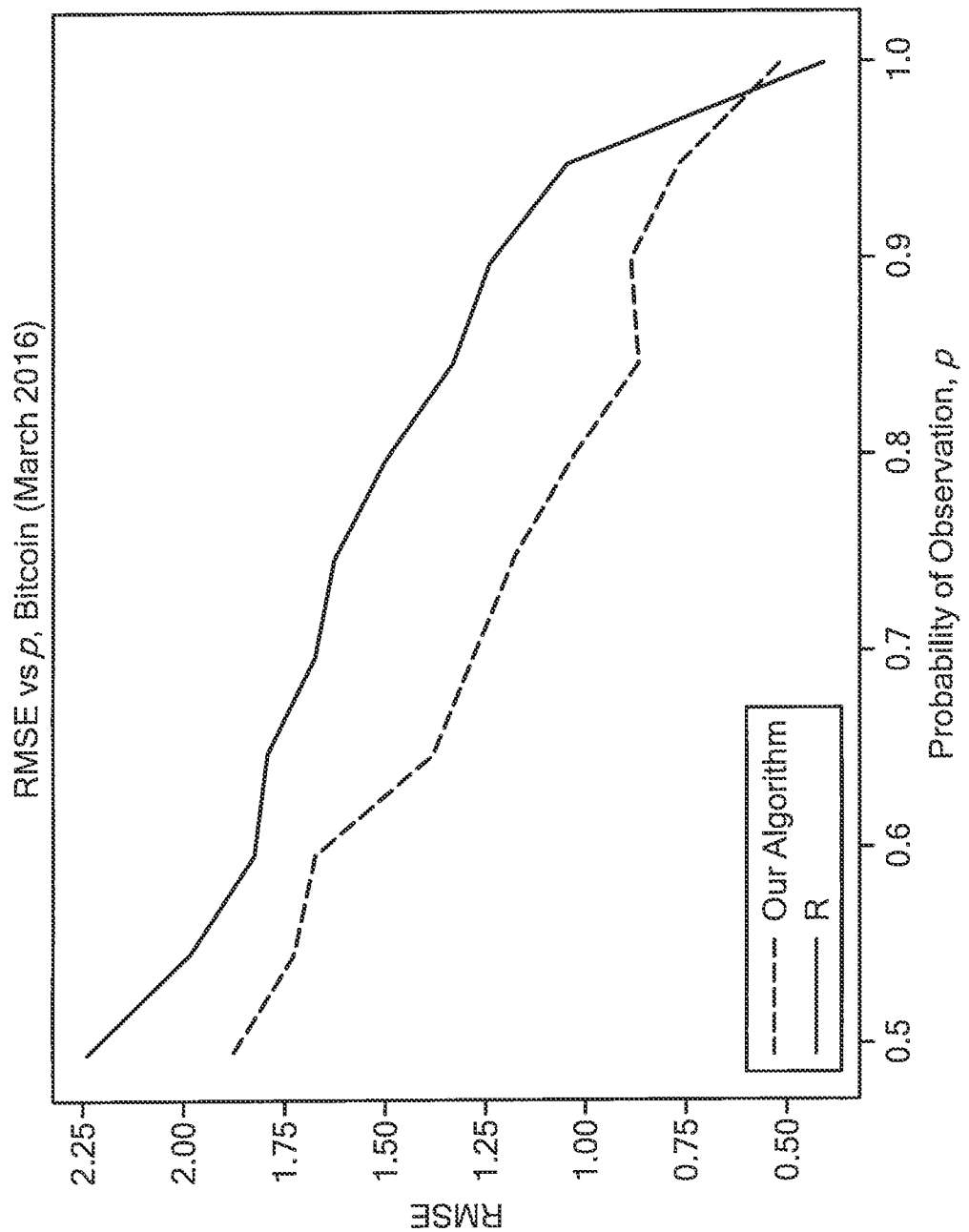
FIG. 13 is a plot comparing, for the data of FIG. 12, RMSE versus data measurement probability when using the R library and an embodiment.

FIG. 12 shows the forecasts for Bitcoin prices (in Yuans) in March 2016 at regular 30 s time intervals, demonstrating classical auto-regressive properties. A week's worth of data was provided to both tested embodiments and the R library to learn and forecast over the next two days. FIG. 12 shows that the disclosed algorithm and the R library both did an excellent job of predicting the future, even with 50% data missing. However, FIG. 13 shows the RMSE of the predictions for the disclosed algorithm and the R library as a function of p, and tested embodiments had RMSE's in the range [0.55, 1.85] vs [0.48, 2.25] for the R library, for p ranging from 1.0 to 0.5 (note prices are not normalized). This highlights the strength of the disclosed algorithm in the presence of missing data.

Google Flu Trends (Peru).

Figure 14:
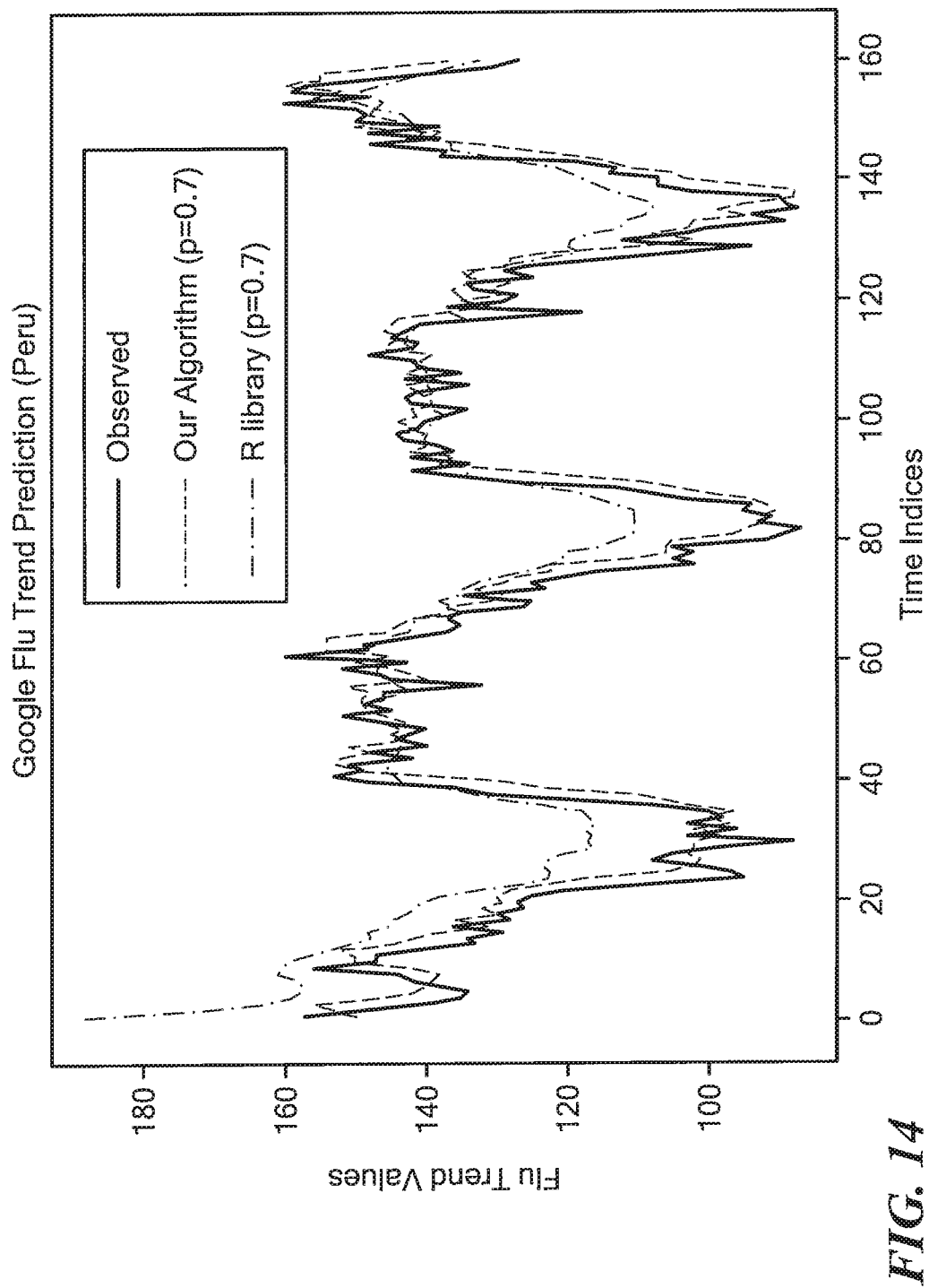
FIG. 14 is a plot comparing actual Google search trends in Peru for the flu over the course of several years with search predictions inferred (after observing 70% of the true data) using the R library and using an embodiment.
Figure 15:
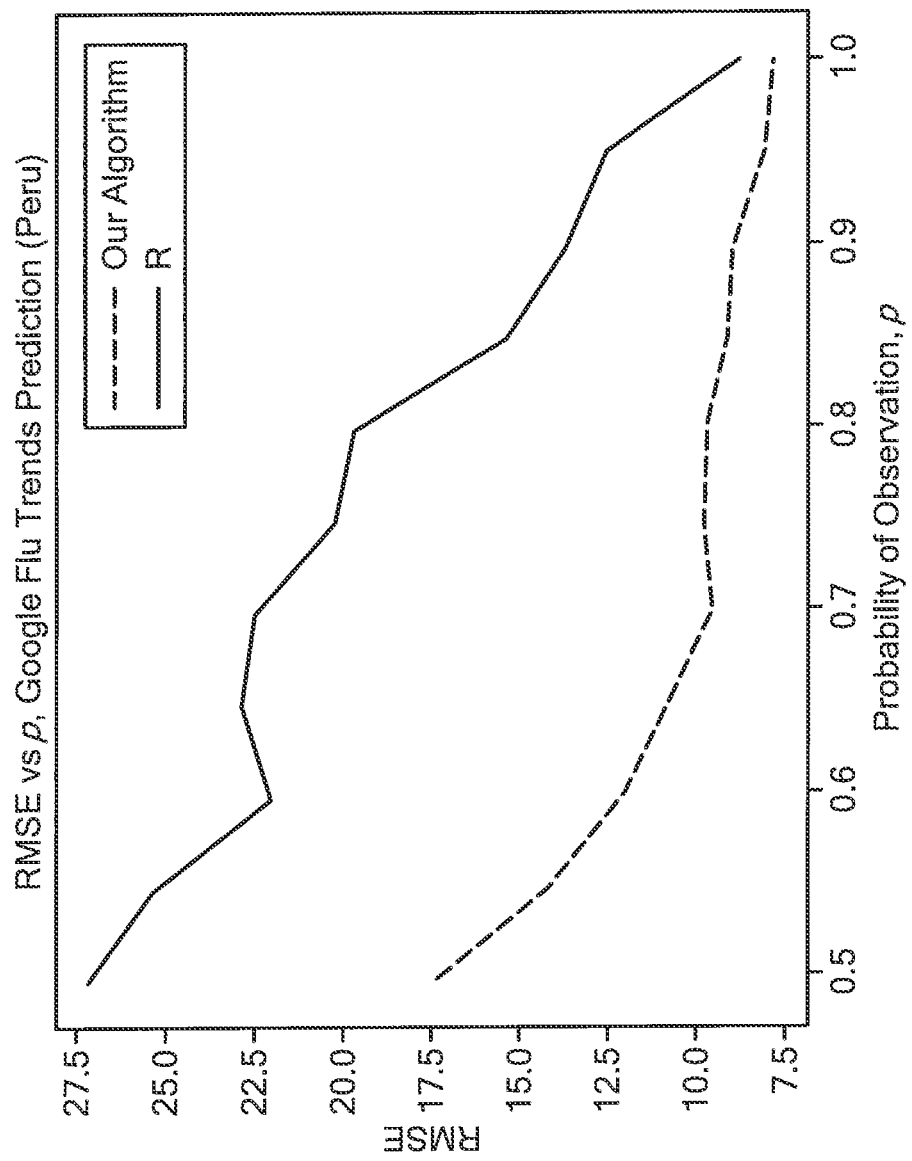
FIG. 15 is a plot comparing, for the data of FIG. 14, RMSE versus data measurement probability when using the R library and an embodiment.

FIG. 14 shows the forecasts for Google flu search-trends in Peru which shows significant seasonality. Weekly data from 2003-2012 was provided to each algorithm, to learn and then forecast for each week in the next three years. FIG. 14 shows that tested embodiments outperformed R when predicting the future with 30% data missing. FIG. 15 shows the RMSE of the predictions as a function of p, indicating outperformance of tested embodiments under all levels of missing data; tested embodiments had RMSE's in range

[8.0, 17.5] vs [9.0, 26.0] for the R library, with p ranging from 1.0 to 0.5 (note prices are not normalized).

Recovering Hidden State

A time series was generated from a Poisson process with time-varying parameters, which were hidden. These parameters evolved according to a mixture of sums of harmonics and trends. These time-varying hidden parameters were estimated using one realization of integer observations, of which several were randomly missing. Each point in the original time series was a Poisson random variable with parameter $\lambda(t)$, i.e. $X(t) \sim \text{Poisson}(\lambda(t))$. Further, the experiment was conducted under the assumption that $\lambda(t) = f(t)$ where $f(t)$ was a time-dependent sum of harmonics and logarithmic trend components. Each $X(t)$ was then observed independently with probability p, to produce a random variable $Y(t)$. All parameters and observations were normalized to lie in [−1, 1]. Observe that $\mathbb{E}[Y(t)] = p\lambda(t)$, similar to the settings described earlier in this work, but with a generic noise model instead of simple additive noise.

Figure 16:
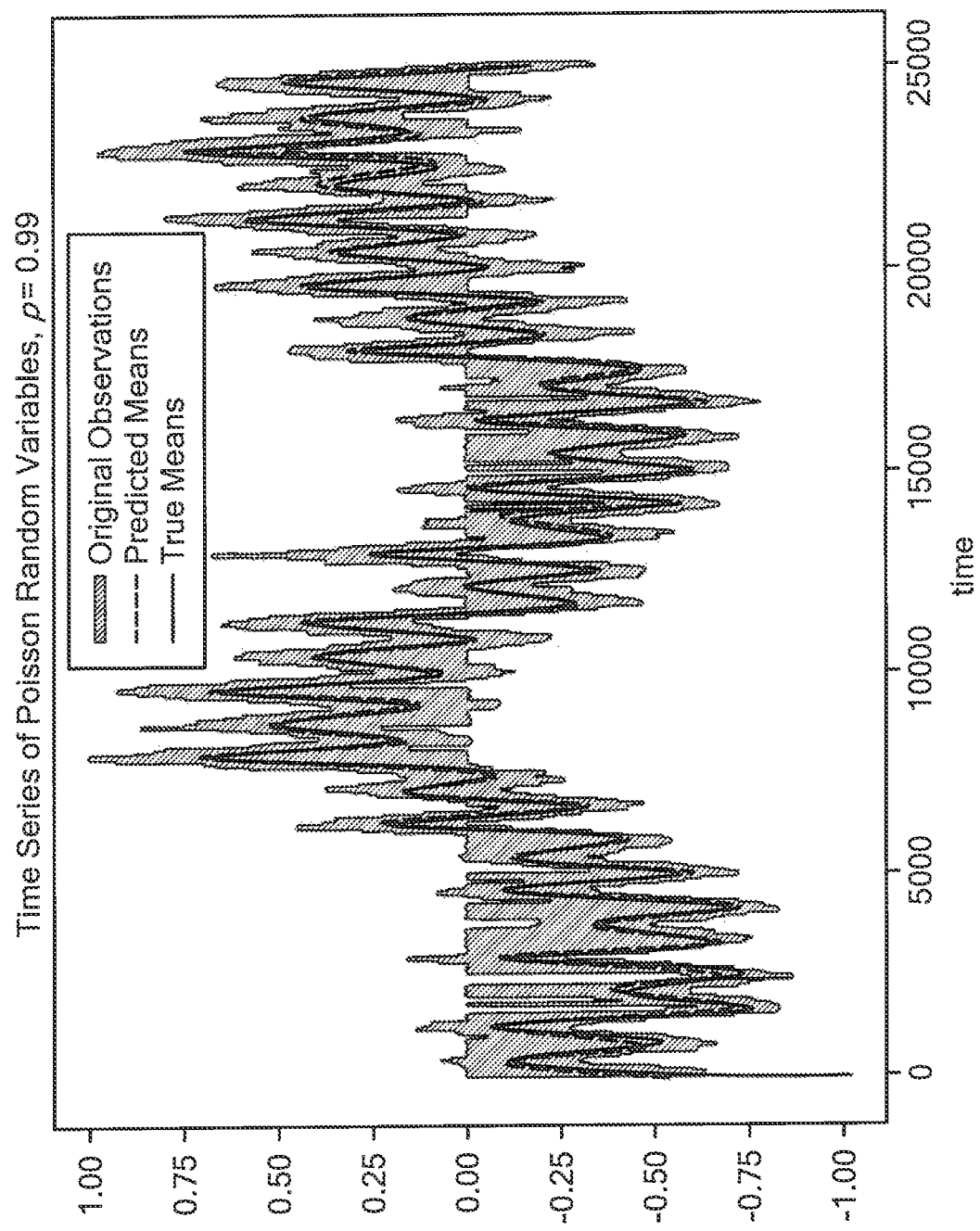
FIG. 16 is a plot comparing true versus predicted means according to an embodiment for a sample time series generated from a synthetic Poisson process having hidden, time-varying parameters, with a probability of 99% that each data point was measured and not missing.
Figure 17:
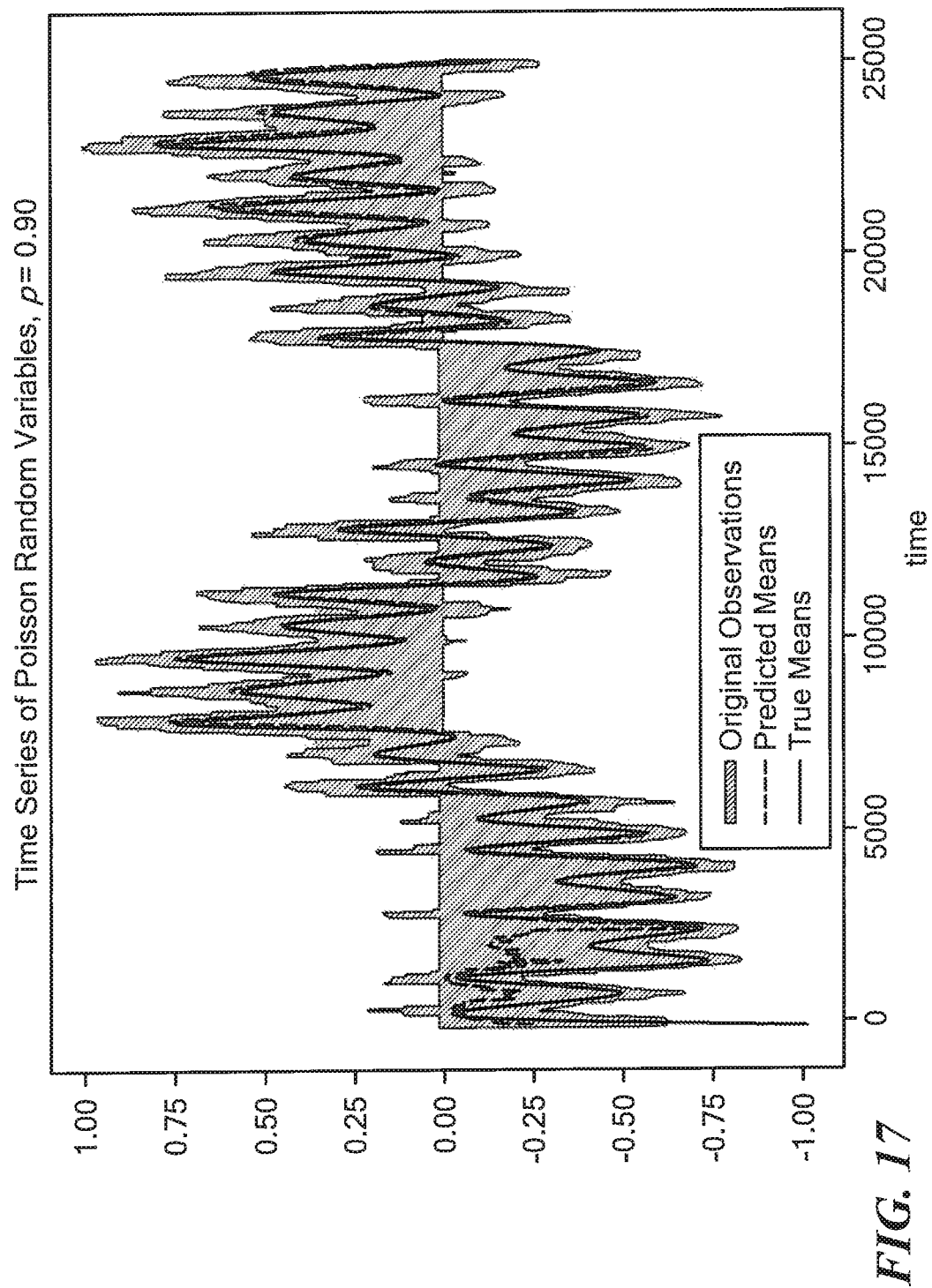
FIG. 17 is a plot comparing true versus predicted means according to an embodiment for a sample time series generated from a synthetic Poisson process having hidden, time-varying parameters, with a probability of 90% that each data point was measured and not missing.
Figure 18:
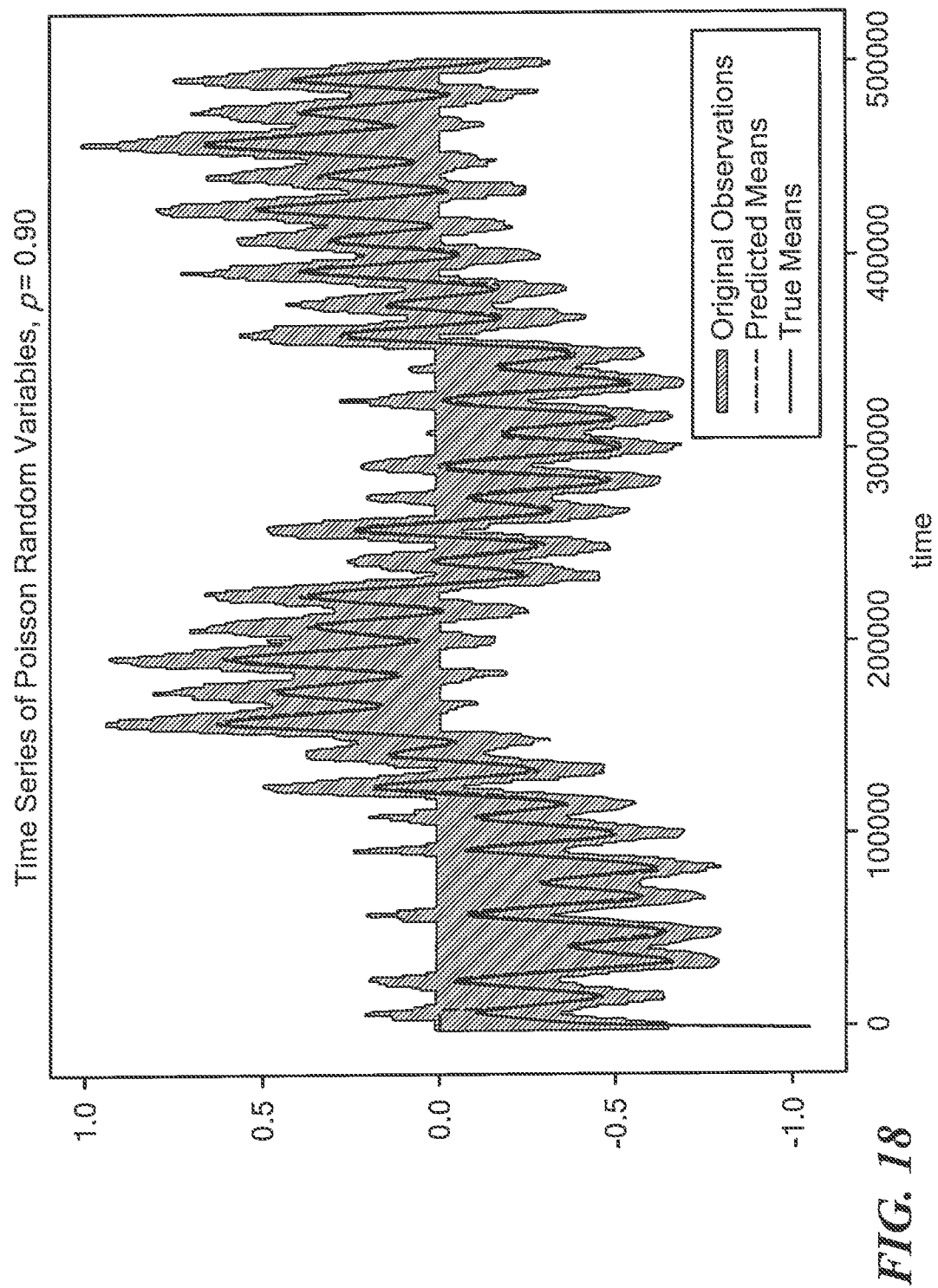
FIG. 18 is a plot of the same Poisson process of FIGS. 16 and 17 with 90% data measurement probability but with 20 times the number of data points, indicating better convergence of the embodiment with more data.

FIGS. 16 and 17 show that the mean time series process can be estimated via imputation using the algorithm described above. These two plots show the original time series (with randomly missing data points set to 0), the true means, and the disclosed estimation. With only 1% missing data, as shown in FIG. 16, tested embodiments were able to impute the means accurately. The performance degraded slightly with 10% missing data, as shown in FIG. 17. However, note that these are relatively small datasets with only 25,000 points. FIG. 18 shows the same process under 10% missing data but for 500,000 data points. As expected, with access to a greater number of data points, tested embodiments performed better.

Figure 19:
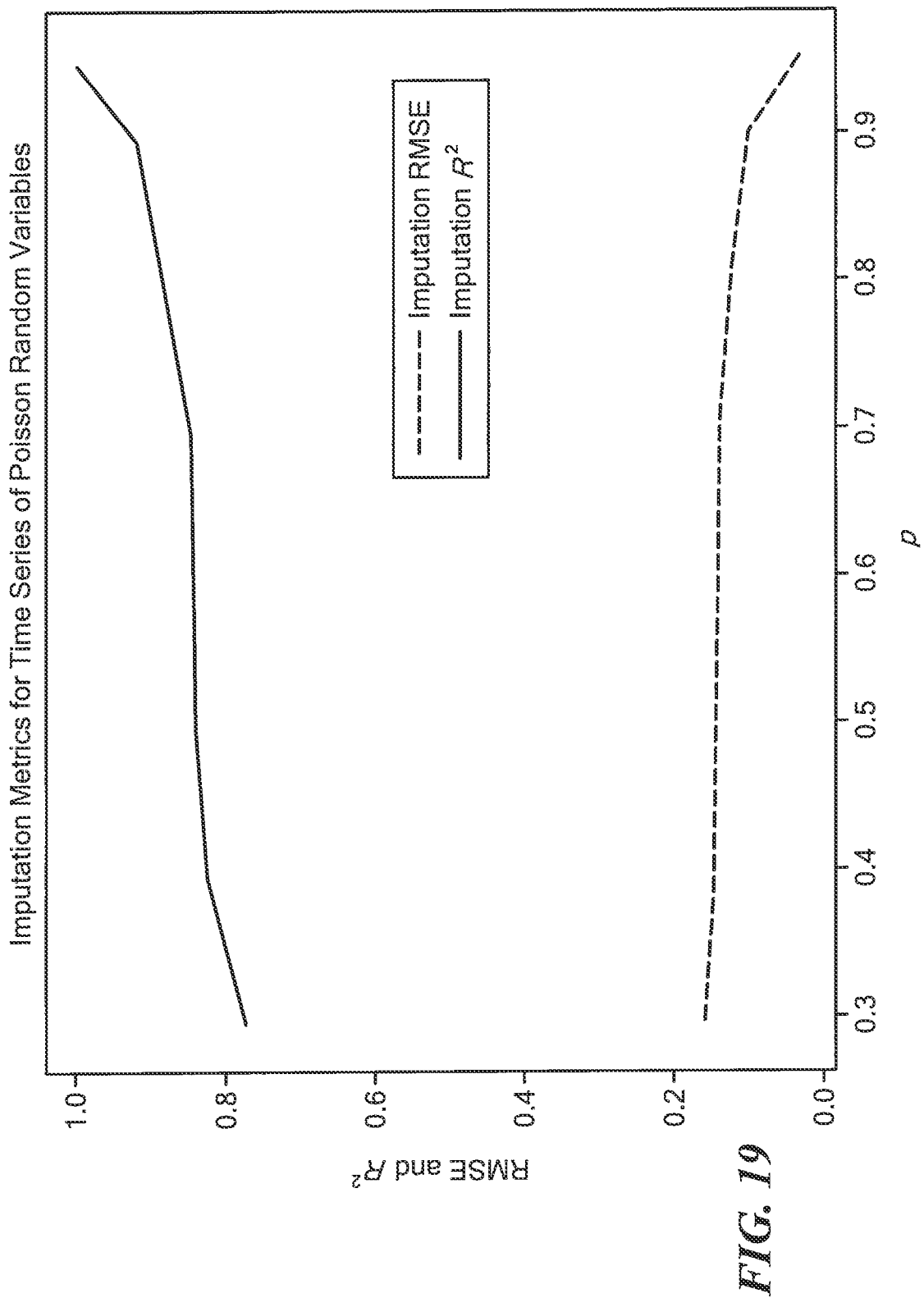
FIG. 19 shows plots of RMSE and $R^2$ for the imputation process of the embodiment of FIGS. 16 and 17.

FIG. 19 shows plots of RMSE and $R^2$ for the imputed means of the process. Note these apply to the smaller time series of 25,000 data points shown in FIGS. 16 and 17, not the larger time series shown in FIG. 18. The metrics were computed only on the data points which were missing. The $R^2$ value rises while the RMSE falls as a p increases, so the imputation improves as a function of p, as might be expected. However, performance is fairly robust (RMSE<0.2 and $R^2 > 0.8$) for all levels of missing data plotted.

Figure 3:
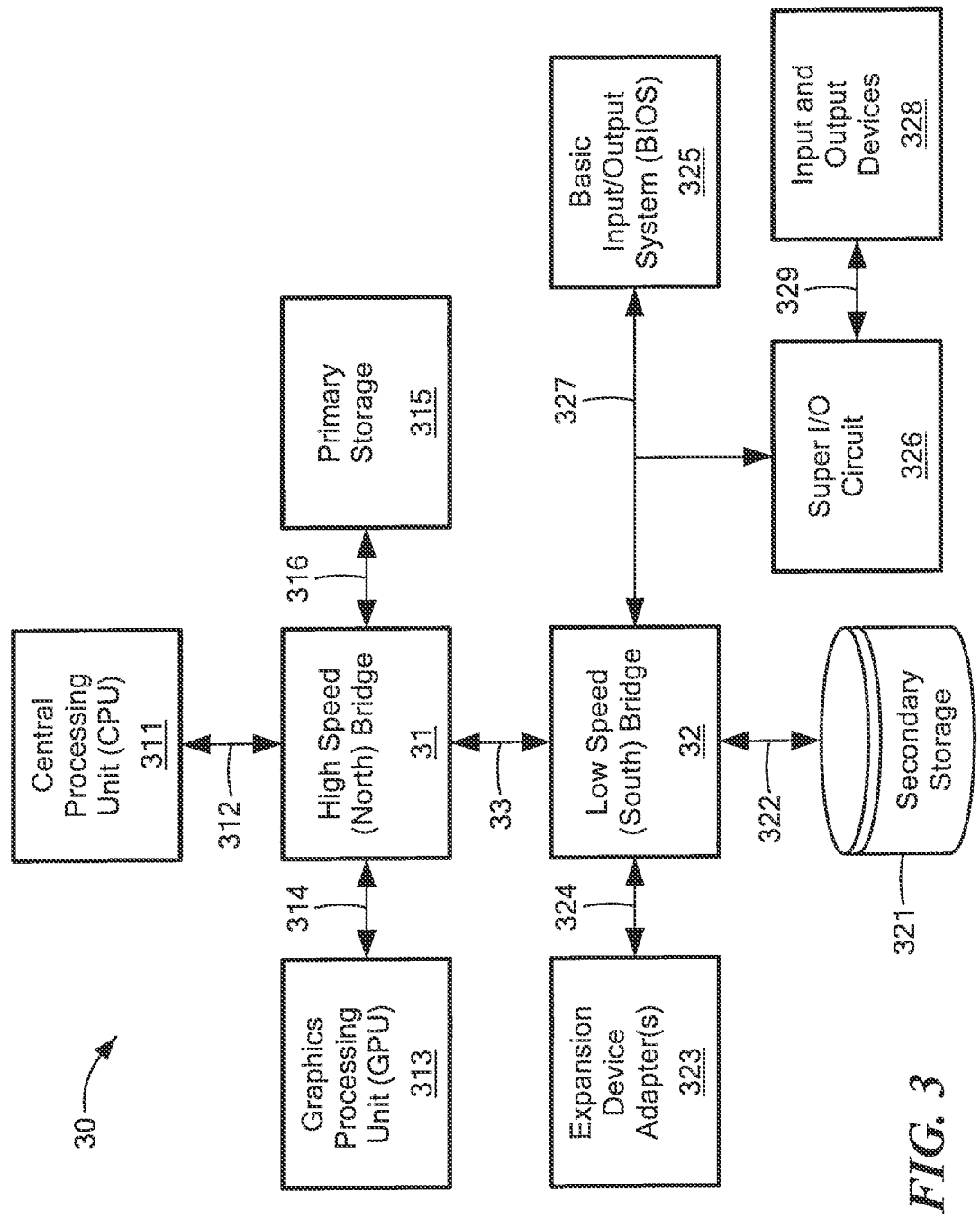
FIG. 3 is a block diagram of a processing system.

FIG. 3 schematically shows relevant physical components of a computer processing system 30 embodiment of the invention, and their respective relationships. Generally, the computer 30 has many functional components that communicate data with each other using data buses. The functional components of FIG. 3 are physically arranged based on the operational speed of each (e.g. speed at which each must operate), and the technology used to communicate data using buses at the necessary speeds to permit such operation.

Thus, the computer 30 is arranged as high-speed components and buses 311-316 and low-speed components and buses 321-329. The high-speed components and buses 311-316 are coupled for data communication using a high-speed bridge 31, also called a "northbridge," while the low-speed components and buses 321-329 are coupled using a low-speed bridge 32, also called a "southbridge."

The computer 30 includes a central processing unit ("CPU") 311 coupled to the high-speed bridge 31 via a bus 312. The CPU 311 is electronic circuitry that carries out the instructions of a computer program. As is known in the art, the CPU 311 may be implemented as a microprocessor; that is, as an integrated circuit ("IC"; also called a "chip" or "microchip"). In some embodiments, the CPU 311 may be implemented as a microcontroller for embedded applications, or according to other embodiments known in the art.

The bus 312 may be implemented using any technology known in the art for interconnection of CPUs (or more particularly, of microprocessors). For example, the bus 312 may be implemented using the HyperTransport architecture developed initially by AMD, the Intel QuickPath Interconnect ("QPI"), or a similar technology. In some embodiments, the functions of the high-speed bridge 31 may be implemented in whole or in part by the CPU 311, obviating the need for the bus 312.

The computer 30 includes one or more graphics processing units (GPUs) 313 coupled to the high-speed bridge 31 via a graphics bus 314. Each GPU 313 is designed to process commands from the CPU 311 into image data for display on a display screen (not shown). In some embodiments, the CPU 311 performs graphics processing directly, obviating the need for a separate GPU 313 and graphics bus 314. In other embodiments, a GPU 313 is physically embodied as an integrated circuit separate from the CPU 311 and may be physically detachable from the computer 30 if embodied on an expansion card, such as a video card. The GPU 313 may store image data (or other data, if the GPU 313 is used as an auxiliary computing processor) in a graphics buffer.

The graphics bus 314 may be implemented using any technology known in the art for data communication between a CPU and a GPU. For example, the graphics bus 314 may be implemented using the Peripheral Component Interconnect Express ("PCI Express" or "PCIe") standard, or a similar technology.

The computer 30 includes a primary storage 315 coupled to the high-speed bridge 31 via a memory bus 316. The primary storage 315, which may be called "main memory" or simply "memory" herein, includes computer program instructions, data, or both, for use by the CPU 311. The primary storage 315 may include random-access memory ("RAM"). RAM is "volatile" if its data are lost when power is removed, and "non-volatile" if its data are retained without applied power. Typically, volatile RAM is used when the computer 30 is "awake" and executing a program, and when the computer 30 is temporarily "asleep", while non-volatile RAM ("NVRAM") is used when the computer 30 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMMs"), or other, similar technology known in the art.

The memory bus 316 may be implemented using any technology known in the art for data communication between a CPU and a primary storage. The memory bus 316 may comprise an address bus for electrically indicating a storage address, and a data bus for transmitting program instructions and data to, and receiving them from, the primary storage 315. For example, if data are stored and retrieved 64 bits (eight bytes) at a time, then the data bus has a width of 64 bits. Continuing this example, if the address bus has a width of 32 bits, then 232 memory addresses are accessible, so the computer 30 may use up to $8*2^{32}=32$ gigabytes (GB) of primary storage 315. In this example, the memory bus 316 will have a total width of 64+32=96 bits. The computer 30 also may include a memory controller circuit (not shown) that converts electrical signals received from the memory bus 316 to electrical signals expected by physical pins in the primary storage 315, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide the CPU 311, the graphics processing units 313, the primary storage 315, and the high-speed bridge 31, or any combination thereof, as a single integrated circuit. In such embodiments, buses 312, 314, 316 may form part of the same integrated circuit and need not be physically separate. Other designs for the computer 30 may embody the functions of the CPU 311, graphics processing units 313, and the primary storage 315 in different configurations, obviating the need for one or more of the buses 312, 314, 316.

The depiction of the high-speed bridge 31 coupled to the CPU 311, GPU 313, and primary storage 315 is merely exemplary, as other components may be coupled for communication with the high-speed bridge 31. For example, a network interface controller ("NIC" or "network adapter") may be coupled to the high-speed bridge 31, for transmitting and receiving data using a data channel. The NIC may store data to be transmitted to, and received from, the data channel in a network data buffer.

The high-speed bridge 31 is coupled for data communication with the low-speed bridge 32 using an internal data bus 33. Control circuitry (not shown) may be required for transmitting and receiving data at different speeds. The internal data bus 33 may be implemented using the Intel Direct Media Interface ("DMI") or a similar technology.

The computer 30 includes a secondary storage 321 coupled to the low-speed bridge 32 via a storage bus 322. The secondary storage 321, which may be called "auxiliary memory", "auxiliary storage", or "external memory" herein, stores program instructions and data for access at relatively low speeds and over relatively long durations. Since such durations may include removal of power from the computer 30, the secondary storage 321 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

The storage bus 322 may be implemented using any technology known in the art for data communication between a CPU and a secondary storage and may include a host adaptor (not shown) for adapting electrical signals from the low-speed bridge 32 to a format expected by physical pins on the secondary storage 321, and vice versa. For example, the storage bus 322 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

The computer 30 also includes one or more expansion device adapters 323 coupled to the low-speed bridge 32 via a respective one or more expansion buses 324. Each expansion device adapter 323 permits the computer 30 to communicate with expansion devices (not shown) that provide additional functionality. Such additional functionality may be provided on a separate, removable expansion card, for example an additional graphics card, network card, host adaptor, or specialized processing card.

Each expansion bus 324 may be implemented using any technology known in the art for data communication between a CPU and an expansion device adapter. For example, the expansion bus 324 may transmit and receive electrical signals using a Peripheral Component Interconnect ("PCI") standard, a data networking standard such as an Ethernet standard, or a similar technology.

The computer 30 includes a basic input/output system (BIOS) 325 and a Super I/O circuit 326 coupled to the low-speed bridge 32 via a bus 327. The BIOS 325 is a non-volatile memory used to initialize the hardware of the computer 30 during the power-on process. The Super I/O circuit 326 is an integrated circuit that combines input and output ("I/O") interfaces for low-speed input and output devices 328, such as a serial mouse and a keyboard. In some embodiments, BIOS functionality is incorporated in the Super I/O circuit 326 directly, obviating the need for a separate BIOS 325.

The bus 327 may be implemented using any technology known in the art for data communication between a CPU, a BIOS (if present), and a Super I/O circuit. For example, the bus 327 may be implemented using a Low Pin Count ("LPC") bus, an Industry Standard Architecture ("ISA") bus, or similar technology. The Super I/O circuit 326 is coupled to the I/O devices 328 via one or more buses 329. The buses 329 may be serial buses, parallel buses, other buses known in the art, or a combination of these, depending on the type of I/O devices 328 coupled to the computer 30.

The techniques and structures described herein may be implemented in any of a variety of different forms. For example, features of the invention may be embodied within various forms of communication devices, both wired and wireless; television sets; set top boxes; audio/video devices; laptop, palmtop, desktop, and tablet computers with or without wireless capability; personal digital assistants (PDAs); telephones; pagers; satellite communicators; cameras having communication capability; network interface cards (NICs) and other network interface structures; base stations; access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A system for estimating latent values of a physical process, the system comprising:
    a data buffer for receiving a first time series of noisy, partial measured values of the physical process, wherein each such value has a given probability of measurement according to an independent, random statistical distribution having a uniformly bounded variance and a mean equal to a corresponding latent value of the physical process;
    a representation processor coupled to the data buffer for accessing the first time series using a non-overlapping matrix representation;
    an imputation and denoising circuit coupled to the representation processor for estimating a mean matrix of the non-overlapping matrix according to an exact or approximate rank of the non-overlapping matrix that is less than both its number of rows and its number of columns; and
    an estimated means memory coupled to the imputation and denoising circuit for storing entries of the mean matrix as a second time series of imputed and denoised latent values of the physical process.

2. A system according to claim 1, wherein the physical process comprises a linear recurrent function, a function with compact support, a finite sum of sublinear trend functions, or an additive combination of any of these.

3. A system according to claim 1, wherein the representation processor comprises data indicating a number of rows and a number of columns of the non-overlapping matrix representation and an address generator for indexing the data buffer according to row and column indices.

4. A system according to claim 1, further comprising a matrix memory for storing the non-overlapping matrix, wherein the representation processor is configured to transform the first time series in the data buffer into a Chinese page matrix in the matrix memory.

5. A system according to claim 1, wherein the imputation and denoising circuit is configured for estimating the mean matrix by:
    factoring the non-overlapping matrix as a product of a first unitary matrix, a diagonal matrix, and a second unitary matrix, wherein entries of the diagonal matrix are singular values of the first matrix;
    forming a reduced diagonal matrix by eliminating zero or more diagonal entries according to a threshold; and
    estimating the mean matrix as the product of the first unitary matrix, the reduced diagonal matrix, and the second unitary matrix.

6. A system according to claim 1, further comprising:
    a regression processor coupled to the imputation and denoising circuit for performing a linear regression on a row of the mean matrix with respect to other rows in the mean matrix, to thereby produce a regression vector having length L; and
    a forecasting processor coupled to the regression processor and estimated means memory for computing an inner product of the regression vector with the last L−1 estimated means, to thereby predict a future value of the physical process.

7. A method of estimating latent values of a physical process, the method comprising:
    in a data buffer, receiving a first time series of noisy, partial measured values of the physical process, wherein each such value has a given probability of measurement according to an independent, random statistical distribution having a uniformly bounded variance and a mean equal to a corresponding latent value of the physical process;
    by a representation processor, accessing the first time series using a non-overlapping matrix representation;
    by an imputation and denoising circuit, estimating a mean matrix of the non-overlapping matrix according to an exact or approximate rank of the non-overlapping matrix that is less than both its number of rows and its number of columns; and
    in an estimated means memory, storing entries of the mean matrix as a second time series of imputed and denoised latent values of the physical process.

8. A method according to claim 7, wherein the physical process comprises a linear recurrent function, a function with compact support, a finite sum of sublinear trend functions, or an additive combination of any of these.

9. A method according to claim 7, wherein accessing the first time series using a non-overlapping matrix representation includes indexing the data buffer according to row and column indices of the matrix representation.

10. A method according to claim 7, accessing the first time series using a non-overlapping matrix representation includes transforming the first time series in the data buffer into a Chinese page matrix in the matrix memory.

11. A method according to claim 7, wherein estimating the mean matrix comprises:
    factoring the non-overlapping matrix as a product of a first unitary matrix, a diagonal matrix, and a second unitary matrix, wherein entries of the diagonal matrix are singular values of the first matrix;
    forming a reduced diagonal matrix by eliminating zero or more diagonal entries according to a threshold; and
    estimating the mean matrix as the product of the first unitary matrix, the reduced diagonal matrix, and the second unitary matrix.

12. A method according to claim 7, further comprising:
    performing a linear regression on a row of the mean matrix with respect to other rows in the mean matrix, to thereby produce a regression vector having length L; and
    computing an inner product of the regression vector with the last L−1 estimated means, to thereby predict a future value of the physical process.

13. A tangible, computer-readable storage medium, in which is non-transitorily stored computer program code for performing a method of estimating latent values of a physical process, the method comprising:
    receiving a first time series of noisy, partial measured values of the physical process, wherein each such value has a given probability of measurement according to an independent, random statistical distribution having a uniformly bounded variance and a mean equal to a corresponding latent value of the physical process;
    accessing the first time series using a non-overlapping matrix representation;
    estimating a mean matrix of the non-overlapping matrix according to an exact or approximate rank of the non-overlapping matrix that is less than both its number of rows and its number of columns; and
    storing entries of the mean matrix as a second time series of imputed and denoised latent values of the physical process.

14. A storage medium according to claim 13, wherein the physical process comprises a linear recurrent function, a function with compact support, a finite sum of sublinear trend functions, or an additive combination of any of these.

15. A storage medium according to claim 13, wherein accessing the first time series using a non-overlapping matrix representation includes indexing the data buffer according to row and column indices of the matrix representation.

16. A storage medium according to claim 13, accessing the first time series using a non-overlapping matrix representation includes transforming the first time series in the data buffer into a Chinese page matrix in the matrix memory.

17. A storage medium according to claim 13, wherein estimating the mean matrix comprises:
   factoring the non-overlapping matrix as a product of a first unitary matrix, a diagonal matrix, and a second unitary matrix, wherein entries of the diagonal matrix are singular values of the first matrix;
   forming a reduced diagonal matrix by eliminating zero or more diagonal entries according to a threshold; and
   estimating the mean matrix as the product of the first unitary matrix, the reduced diagonal matrix, and the second unitary matrix.

18. A storage medium according to claim 13, further comprising computer program code for:
   performing a linear regression on a row of the mean matrix with respect to other rows in the mean matrix, to thereby produce a regression vector having length L; and
   computing an inner product of the regression vector with the last L−1 estimated means, to thereby predict a future value of the physical process.

* * * * *